United States Patent
Aoyama et al.

(10) Patent No.: US 7,987,091 B2
(45) Date of Patent: Jul. 26, 2011

(54) DIALOG CONTROL DEVICE AND METHOD, AND ROBOT DEVICE

(75) Inventors: Kazumi Aoyama, Saitama (JP); Yukiko Yoshiike, Tokyo (JP); Shinya Ohtani, Kanagawa (JP); Rika Horinaka, Tochigi (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1553 days.

(21) Appl. No.: 10/536,926

(22) PCT Filed: Dec. 2, 2003

(86) PCT No.: PCT/JP03/15375
§ 371 (c)(1),
(2), (4) Date: May 31, 2005

(87) PCT Pub. No.: WO2004/051499
PCT Pub. Date: Jun. 17, 2004

(65) Prior Publication Data
US 2006/0047362 A1 Mar. 2, 2006

(30) Foreign Application Priority Data
Dec. 2, 2002 (JP) ................................. 2002-350137

(51) Int. Cl.
*G10L 15/06* (2006.01)
(52) U.S. Cl. ...................................................... 704/245
(58) Field of Classification Search ...... 707/2; 700/245; 709/204
See application file for complete search history.

(56) References Cited

U.S. PATENT DOCUMENTS

| 5,340,317 | A  | * | 8/1994  | Freeman ........................ 434/321 |
| 5,878,385 | A  | * | 3/1999  | Bralich et al. ..................... 704/9 |
| 5,918,222 | A  | * | 6/1999  | Fukui et al. ........................... 1/1 |
| 6,615,111 | B2 | * | 9/2003  | Tackett et al. ................. 700/246 |
| 6,714,840 | B2 | * | 3/2004  | Sakaue et al. ................. 700/245 |
| 6,975,970 | B2 | * | 12/2005 | Thorisson ......................... 703/1 |
| 7,062,073 | B1 | * | 6/2006  | Tumey et al. ................. 382/118 |
| 7,099,742 | B2 | * | 8/2006  | Tajima et al. ................. 700/245 |
| 7,107,218 | B1 | * | 9/2006  | Preston ......................... 704/270 |
| 7,177,798 | B2 | * | 2/2007  | Hsu et al. .......................... 704/9 |
| 7,415,537 | B1 | * | 8/2008  | Maes ............................ 709/246 |
| 7,418,382 | B1 | * | 8/2008  | Maes ............................ 704/236 |
| 7,447,635 | B1 | * | 11/2008 | Konopka et al. .............. 704/275 |
| 7,539,656 | B2 | * | 5/2009  | Fratkina et al. .................. 706/45 |
| 2001/0021909 | A1 |   | 9/2001  | Shimomura et al. |

FOREIGN PATENT DOCUMENTS

| JP | 2001-188782 | 7/2001 |
| JP | 2001-188784 | 7/2001 |
| JP | 2001-188785 | 7/2001 |
| JP | 2001-188787 | 7/2001 |

\* cited by examiner

*Primary Examiner* — Michael N Opsasnick
(74) *Attorney, Agent, or Firm* — Frommer Lawrence & Haug LLP; William S. Frommer; Ellen Marcie Emas

(57) ABSTRACT

A robot can make a dialog customized for the user by first storing various pieces of information appendant to an object as values of the corresponding items of the object. A topic that is related to the topic used in the immediately preceding conversation is then selected. Then, an acquisition conversation for acquiring the value of the item of the selected topic or a utilization conversation for utilizing the value of the item of the topic that is already stored is generated as the next conversation. The value acquired by the acquisition conversation is stored as the value of the corresponding item.

34 Claims, 15 Drawing Sheets

| ID | Name | | Kind | | FaceID | SpeakerID | BIRTHDAY | | Favorite | | Friend | |
|----|------|---|------|---|--------|-----------|----------|---|----------|---|--------|---|
| 1 | YUKIKO | 3 | HUMAN | 2 | 0 | 2 | 1 | 2 | 73/5/2 | 2 | TEA | 3 | KAZUMI | 2 |
| 2 | KAZUMI | 1 | HUMAN | 2 | 3 | 3 | 4 | 3 | 75/8/16 | 5 | HORSE | 3 | TARO | 5 |
| 3 | SUZUKI | 5 | HUMAN | 2 | 6 | 3 | 8 | 3 | 74/3/10 | 2 | TEA | 3 | TARO | 2 |
| 4 | TEA | 2 | DRINK | 2 | 4 | 1 | | | | | | | | |
| 5 | ICE CREAM | 4 | FOOD | 3 | 5 | 2 | | | | | | | | |
| 6 | TARO | 2 | HUMAN | 3 | 8 | 2 | 9 | 3 | 76/10/10 | 4 | HORSE RACING | 3 | SUZUKI | 3 |

FIG. 4

DIALOG CONTROL DEVICE AND METHOD, AND ROBOT DEVICE

TECHNICAL FIELD

This invention relates to a dialog control device, a dialog control method and a robot device. For example, the present invention can suitably be used for entertainment robots.

BACKGROUND ART

In recent years, many entertainment robots have been marketed for family use. Assume such an entertainment robot lives with a user in a family. When a task is given to the robot by the user, for example a command of "Kick the ball" is given from the user, the robot is required not only to perform the task of "kicking the ball" but also to spontaneously take an action that is full of variety in order to avoid one-way communications and make everyday interactions with the robot not boring to the user.

Known voice interaction systems are mostly intended to perform a task such as presetting a recording operation of a video recorder, giving guidance for a telephone number or the like (see, for example, Non-Patent Document 1). Other algorithms for generating a response in a dialog include simple responsive sentence generating systems including that of Eliza, which may be a representative example (see, for example, Non-Patent Document 2).

For an entertainment robot to spontaneously take an action that is full of variety, data relating to a number of different pieces of knowledge and action patterns that are full of variety have to be given to the robot in advance for the purpose of various different interactions. However, in reality, the volume of data that can be given to an entertainment robot is limited.

Additionally, when building a robot, it will require tremendous efforts to prepare data that matches the personality of the user of the robot. Therefore, many robots are actually made to have same knowledge in advance. Then, the user of a robot may hardly feel affinity for the robot and that "the robot is unique to him or her". On the other hand, each robot that lives in a family is required to take personalized and attractive action.

If it is possible to build a robot who can actively or passively acquire various pieces of information such as the name, the birthday, the sex of the user, what the user likes and what the user does not like by way of interactions with the user so as to be able to communicate with the user, using the acquired information, such a robot will be free from the above identified problems and satisfy the user.

Additionally, if such a robot can show the user the learning process of using conversations with the user, the user can share the learning experience. Furthermore, if the robot speaks what the robot has been taught, the user will have a feeling of intimacy to the robot.

Non-Patent Document 1: Information Processing Society, Research Meeting Report, Voice Language Information Processing 22-8 (1998 Jul. 24), pp. 41-42

Non-Patent Document 2: Physicality and Computer, Kyoritsu Publishing, pp. 258-268

However, a number of problems arise when a robot actively or passively acquires various pieces of information that are attributes of a person or a thing (object) such as the name, the birthday, and the sex of the user, what the user likes and what the user does not like, stores them in the form of memory and dialogs, utilizing the memory, as an example of conversation of the robot, using information on the user.

Firstly, there is a problem how the robot acquires memory that is customized for the user. The memory capacity of a robot is limited and the framework for storing information is defined in advance so that the robot cannot store everything that appears in conversations. Additionally, it is difficult to process the speech made by the user at unpredictable timings and store them in a memory device for the current level of technology.

However, this problem can be solved by adopting a technique by which the robot makes a speech to acquire memory such as "Tell me the name of the fried of ○○!" and discloses what the robot can memorize by acting on the user so as to have the user tell the value. Thus, the robot can act on the user so as to be able to collect information with ease when the robot does so to acquire memory.

Secondly, there is also a problem how the robot utilizes the acquired memory to make a speech. If the robot makes a speech, randomly utilizing the acquired memory, transition of topics will occur out of context to embarrass the user. Therefore, there needs a scheme (association) of utilizing correlated things in the memory the robot has acquired for the next speech. Additionally, if the acquired memory is output as it is, a speech can only correspond to an item of the memory on a basis of one to one correspondence so that interactions will be limited in terms of variations.

Thirdly, there is a problem when the robot acquires memory and when it utilizes the memory for a conversation. In other words, a state where an action trying to utilize the memory is taken in a situation where no information that is appendant to an object is available or a state where an action trying to acquire memory is taken in a situation where all the information has been acquired needs to be avoided. A scheme needs to be established to avoid such a state. Additionally, if the robot memorizes a thing and takes an action immediately thereafter to utilize the memorized thing, the robot may not appear to have a memory device for memorizing things and the action of the robot may not appear as intellectual action. Then, there arises a problem that the action of the robot may not be entertaining.

DISCLOSURE OF THE INVENTION

In view of the above problems, it is therefore an object of the present invention to propose a dialog control device, a dialog control method and a robot device with an enhanced level of entertainment.

According to the present invention, the above object is achieved by providing a dialog control device comprising: a memory means for storing various pieces of information appendant to an object as values corresponding to respective items of the object; and a conversation generation means for selecting, in response to an item of the object defined as topic, another topic relating to the topic used in the immediately preceding conversation and generating an acquisition conversation for acquiring the value of the item selected as topic or a utilization conversation for utilizing the value of the item in the topic already stored in the memory means as the next conversation; the conversation generation means being adapted to store the acquired value acquired by the acquisition conversation as the value of the corresponding item.

Then, with a dialog control device as defined above, the dialog control device can make a conversation that is customized for the user, or the object, with the user.

In another aspect of the invention, there is provided a dialog control method comprising: a first step of storing various pieces of information appendant to an object as values corresponding to respective items of the object; and a second step of selecting, in response to an item of the object defined as topic, another topic relating to the topic used in the immediately preceding conversation and generating an acquisition conversation for acquiring the value of the item selected as topic or a utilization conversation for utilizing the value of the item in the already stored topic as the next conversation; the acquired value acquired by the acquisition conversation being stored in the second step as the value of the corresponding item.

Then, with a dialog control method as defined above, the dialog control device can make a conversation that is customized for the user, or the object, with the user.

According to the invention, there is provided a robot device comprising: a memory means for storing various pieces of information appendant to an object as values corresponding to respective items of the object; and a conversation generation means for selecting, in response to an item of the object defined as topic, another topic relating to the topic used in the immediately preceding conversation and generating an acquisition conversation for acquiring the value of the item selected as topic or a utilization conversation for utilizing the value of the item in the topic already stored in the memory means as the next conversation; the conversation generation means being adapted to store the acquired value acquired by the acquisition conversation in the memory means as the value of the corresponding item.

Then, with a robot device as defined above, the dialog control device can make a conversation that is customized for the user, or the object, with the user.

BRIEF DESCRIPTION OF THE DRAWINGS

FIG. 4 is a conceptual illustration of the format of recording the acquired information.

BEST MODE FOR CARRYING OUT THE INVENTION

Now, an embodiment of the present invention will be described in detail by referring to the accompanying drawings.

(1) Configuration of Robot 1 of this Embodiment (1-1) Hardware Configuration of Robot 1

Figure 1:
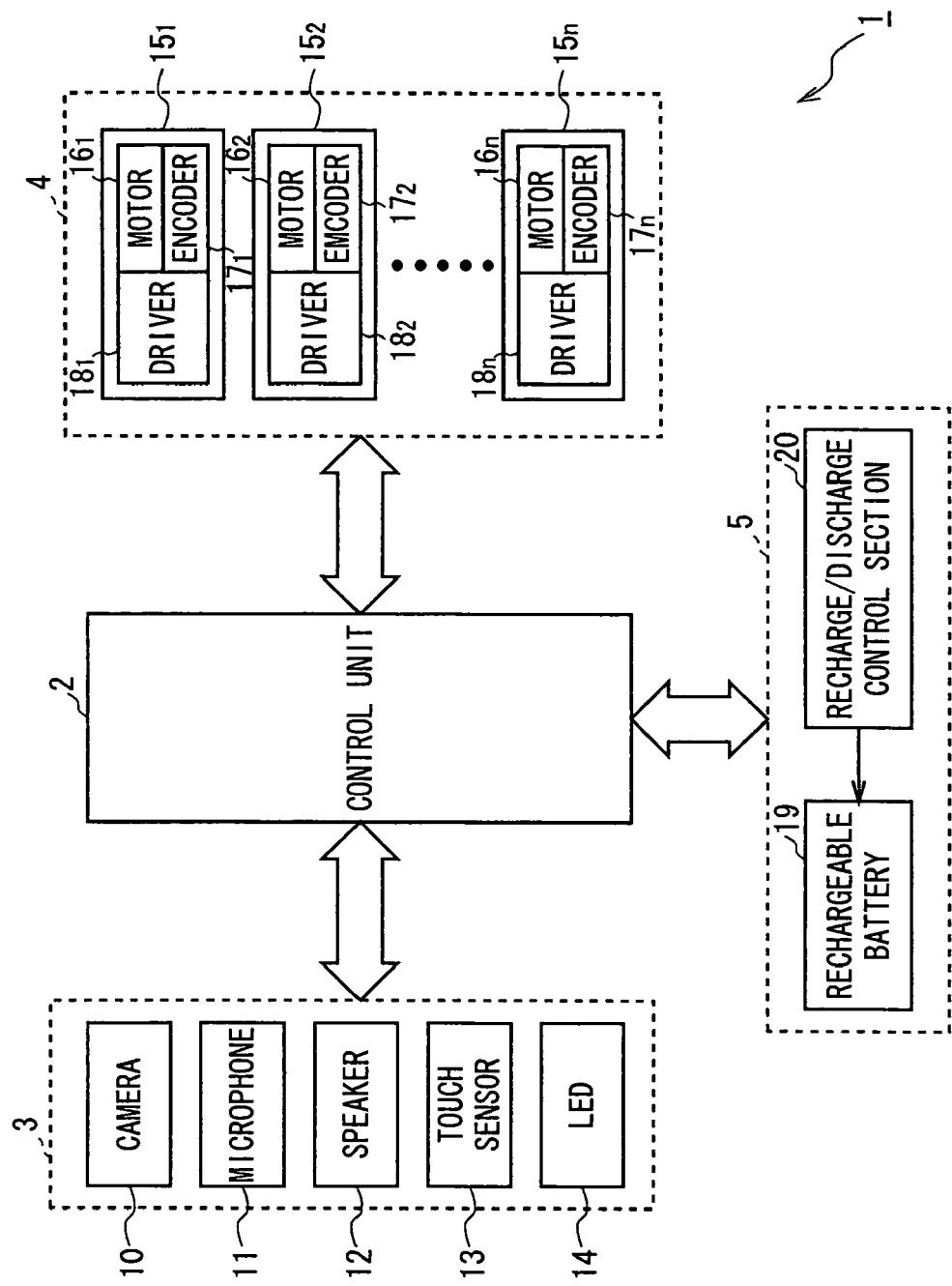
FIG. 1 is a schematic block diagram of an embodiment of robot, showing its functional configuration.

FIG. 1 is a schematic block diagram of an embodiment of robot 1, showing its functional configuration. As shown in FIG. 1, the robot 1 comprises a control unit 2 that comprehensively controls the action of the entire robot and performs other data processing operations, an input/output section 3, a drive section 4 and a power supply section 5.

The input/output section 3 includes CCD (charge coupled device) cameras 10 that operate as eyes, microphones 11 that operate as ears and touch sensors 13 that are arranged respectively on the head, the back and other positions to sense any touches made by a user as well as other sensors, which operate as the five senses, or input section. Additionally, it includes as output section a speaker 12 that operates as mouth and LED indicators (eye lamps) 14, which produce facial expressions as some of them are combined and turned on, along with other elements. The output section can express "You feed back(?)" by means of voice and flashing lamps in formats other than mechanical motion patterns of the limbs of the robot 1.

The drive section 4 is a functional block for realizing an action of the robot 1 according to one of the predetermined motion patterns specified by the control unit 2. Therefore, it is the object of control in action control operations. The drive section 4 is a functional module for realizing certain degree of freedom for each of the joints of the robot 1. Each of the joints has a plurality of drive units $15_1$~$15_n$ arranged for axes of rolling, pitching, yawing and so on. The drive units $15_1$~$15_n$ respectively include motors $16_1$~$16_n$ for giving rise to rotary motions around the respective axes, encoders $17_1$~$17_n$ for detecting rotary positions relative to the respective motors $16_1$~$16_n$ and drivers $18_1$~$18_n$ for adaptively controlling the rotary positions and the rotary speeds of the respective motors $16_1$~$16_n$ according to the outputs of the encoders $17_1$~$17_n$.

Thus, it is possible to form the robot 1 as a legged robot, which may be a two-legged robot or a four-legged robot, by combining drive units.

The power supply section 5 is a functional module for literally supplying power to each of the electric circuits in the robot 1. The robot 1 of this embodiment is of the autonomous drive type and uses a battery. Thus, the power supply section 5 includes a rechargeable battery 19 and a recharge/discharge control section 20 for controlling the charging condition of the rechargeable battery 19.

The rechargeable battery 19 is typically a "battery pack" that is a cartridge type package of a plurality of lithium ion secondary battery cells.

The recharge/discharge control section 20 grasps the remaining capacity of the rechargeable battery 19 by observing the terminal voltage and the recharging/discharging electric current of the rechargeable battery 19 and also the ambient temperature of the rechargeable battery 19 and determines the starting time and the terminating time of each recharging operation. The starting time and the terminating time of each recharging operation that are determined by the recharge/discharge control section 20 are notified to the control unit 2 to respectively trigger the start and the end of a recharging operation of the robot 1.

The control unit 2 is the "brain" and mounted in the head section or the trunk section of the robot 1.

Figure 2:
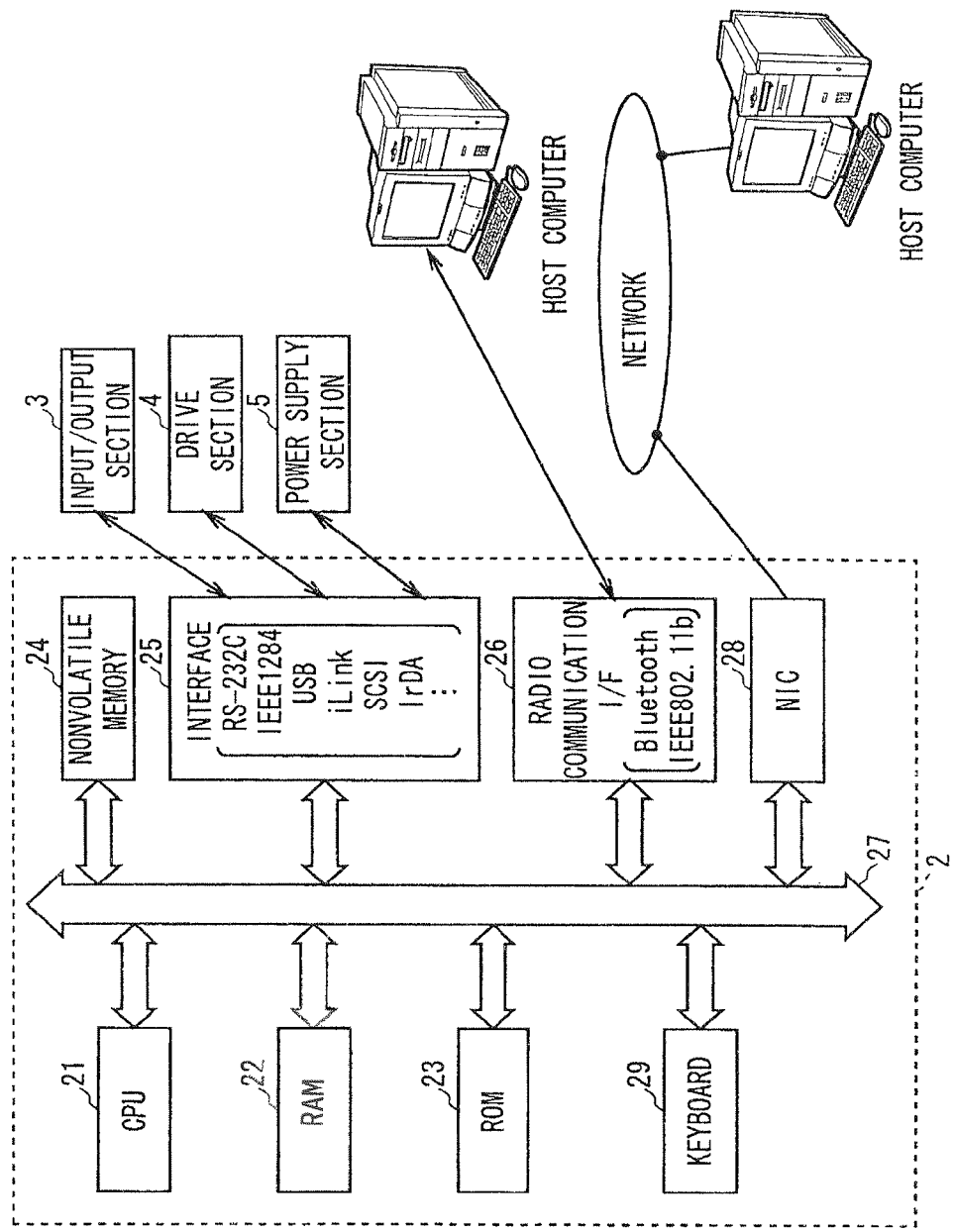
FIG. 2 is a schematic block diagram of the control unit, showing its configuration.

As shown in FIG. 2, the control unit 2 includes a CPU (central processing unit) 21 that operates as main controller and is connected to other circuit components, peripheral devices and a bus. The bus 27 is a common signal transmission path and includes a data bus, an address bus and control bus. Specific addresses (memory addresses or I/O addresses) are assigned to the respective devices on the bus 27. The CPU 21 can communicate with any specific device on the bus 27 by addressing it.

The RAM (read access memory) 22 is a volatile and writable memory that may be a DRAM (dynamic RAM). It is adapted to load the program codes that the CPU 21 executes and temporarily store operation data by way of an active program.

The ROM (read only memory) 23 is a read only memory dedicated to permanently store programs and data. The program codes stored in the ROM 23 include a self-diagnostic test program that is executed when power is supplied to the robot 1 and control programs for defining actions of the robot 1.

The control programs of the robot 1 include "sensor input/recognition processing programs" for processing the input to any of the sensors, which may be the CCD cameras 10 or the microphone 11, and recognizing it as symbol, "action control programs" that operate for short term memory and long term memory and control the actions of the robot 1 on the basis of the sensor input and predetermined action control models and "drive control programs" for controlling the operation of driving each of the joint motors and the voice output of the speaker 12 according to action control models.

The nonvolatile memory 24 is an electrically erasable/writable memory device such as EEPROM (electrically erasable and programmable ROM) that is adapted to be used to hold data to be sequentially updated in a non-volatile way. Data to be sequentially updated may include keys of cryptograph and other security information as well as device control programs to be installed after the shipment.

The interface 25 is a device for interconnecting the devices other than the control unit 2 so as to allow them exchange data. The interface 25 is used to send data to and receive data from the CCD cameras 10, the microphones 11 and/or the speaker 12 of the input/output section 3. The interface 25 is also used to send data to and receive data from the drivers $18_1$~$18_n$ of the drive section 4.

The interface 25 may comprise one or more than one general purpose interfaces for connecting a computer and peripheral devices including serial interfaces such as RS (Recommended Standard)-232C, parallel interfaces such as IEEE (Institute of Electrical and Electronics Engineers) 1284, USB (universal serial bus) interfaces, i-Link (IEEE1394) interfaces, SCSI (small computer system interface) interfaces and memory card interfaces (card slots) adapted to accept a PC card or a memory stick so that programs and data may be moved between the control unit 2 and locally connected external devices.

Alternatively, the interface 25 may include one or more than one infrared communication (IrDA) interfaces so that the control unit 2 may communicate with external devices wirelessly.

The control unit 2 includes a radio communication interface 26, a network interface card (NIC) 28 and so on so that it may communicate with various external host computers for data communications by way of short range radio data communication networks such as Bluetooth, radio networks such as IEEE802.11b and long range networks such as the Internet.

Due to data communications between the robot 1 and host computers, it is possible to perform computational operations necessary for controlling complex actions of the robot 1 and remotely control the robot 1 by using remote computer resources.

(1-2) Software Configuration of Robot 1

Figure 3:
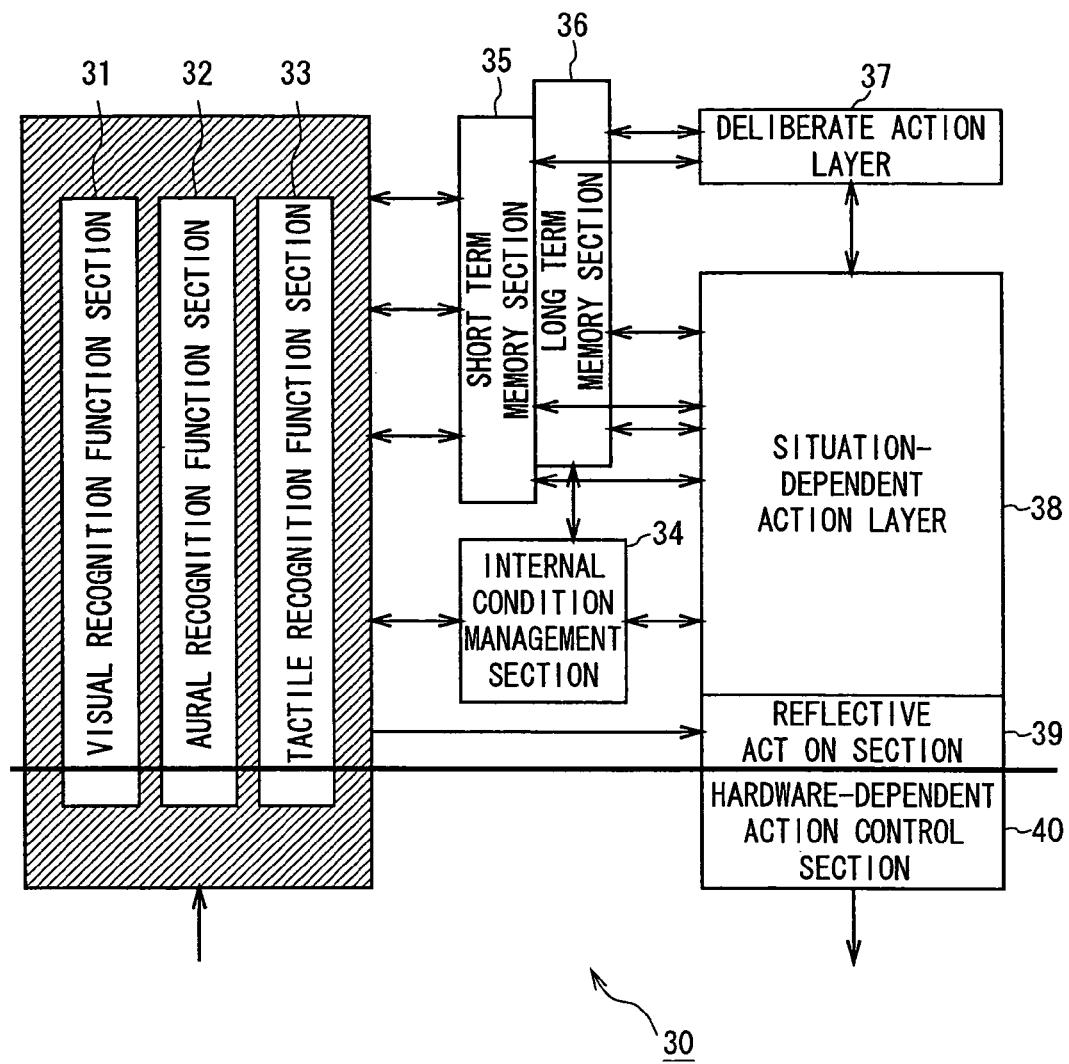
FIG. 3 is a schematic block diagram of the software of the robot, showing its configuration.

FIG. 3 is a schematic illustration of the action control system 30 of the robot 1 formed by a group of control programs stored in the ROM 23, showing its functional configuration. The robot 1 can be controlled for actions in response to the outcome of recognition of one or more than one external stimuli and that of the change in the internal conditions. Additionally, the robot 1 can be controlled for actions in response to the outcome of recognition of one or more than one external stimuli and that of the change in the internal conditions due to its long term memory feature that allows it to associate the change in the internal conditions with the external stimuli and memorize it.

The action control system 30 is installed to adopt object-directed programming. In this case, each piece of software is handled in terms of module unit that is referred to as "object" in which data and the processing procedure for the data are unified. Each object can deliver to and receive data from another object and also invoke another object by an inter-object communication method that uses message communications and common memories.

The action control system 30 includes a visual recognition function section 31, an aural recognition function section 32 and a tactile recognition function section 33 adapted to recognize the external environment on the basis of the outputs of the CCD cameras 10, the microphones 11 and the touch sensors 13.

The visual recognition function section 31 performs image processing operations of recognizing faces and colors on the basis of the video signals output from the CCD cameras 10 and extracts characteristics. Then, the visual recognition function section 31 outputs a face ID (identifier) specific to each person it recognizes, information on the position and the size of the face image region and information on the position and the size of each color region and the characteristic amounts obtained as a result of color recognition as well as other pieces of information.

The aural recognition function section 32 performs sound processing operations of recognizing voices, speakers and other various sounds on the basis of the audio signals output from the microphones 11. Then, the aural recognition function section 32 outputs character string information of each word it recognizes and a speaker ID specific to each speaker it recognizes as a result of speaker recognition processing performed on the basis of acoustic characteristics and so on.

The tactile recognition function section 33 recognizes each external stimulus such as "being stroked" or "being hit" on the basis of the pressure detection signal output from any of the touch sensors 13 and outputs the outcome of the recognition.

The internal condition management section 34 manages formula models of emotions of several different types including instincts and sentiments so as to manage the internal condition of the robot 1 in terms of instincts and sentiments in response to each external stimulus recognized by the visual recognition function section 31, the aural recognition function section 32 and/or the tactile recognition function section 33.

On the other hand, the action control system 30 also includes a short term memory section 35 for short term memories that will be lost with time and a long term memory section 36 that holds information for a relatively long time for the purpose of controlling actions in response to the outcome of recognition of external stimuli and changes in the internal conditions. The classification of memory mechanism of short term memory and long term memory relies on neuro-psychology.

The short term memory section 35 is a functional module for holding the targets and the events as recognized by the visual recognition function section 31, the aural recognition function section 32 and/or the tactile recognition function section 33 for a short period of time. For example, it stores the image input from any of the CCD cameras 10 for a short period of time of about 15 seconds.

The long term memory section 36 is used to hold the information that is obtained by learning such as the name of an object for a relatively long period of time. The RAM 22 and the non-volatile memory 24 in the control unit 2 (FIG. 2) are utilized for it.

Actions of the robot 1 that are produced by the action control system 30 are globally classified into "reflective actions" that are realized by reflective action section 39, "situation-dependent actions" that are realized by situation-dependent action layer 38 and "deliberate actions" that are realized by deliberate action layer 37.

The reflective action section 39 is a functional module for realizing reflective acts of the robot in response to external stimuli recognized by the visual recognition function section 31, the aural recognition function section 32 and/or the tactile recognition function section 33.

A reflective action basically refers to an action of directly receiving the outcome of recognition of the external information input by any of the sensors, classifying it and directly determining the output action. For example, actions such as an action of running after a human face and a nodding action are preferably installed as reflective actions.

The situation-dependent action layer 38 controls actions of the robot 1 immediately responding to the current situation of the robot 1 on the basis of the contents stored in the short term memory section 35 and those stored in the long term memory section 36 and the internal condition managed by the internal condition management section 34.

The situation-dependent action layer 38 prepares a state machine for each action, classifies the outcome of recognition of the external information input from any of the sensors, depending on previous actions and situations, and demonstrates the action of the robot 1. The situation-dependent action layer 38 also realize actions for maintaining the internal condition within a certain scope (also referred to as "homeostasis actions") and, when the internal condition goes beyond the specified scope, it activates the actions of the robot 1 in such a way that actions for returning the internal condition back to the scope can easily appear (in reality, actions are selected by taking both the internal condition and the external environment into consideration), The response time of a situation-dependent action is longer than that of a reflective action.

The deliberate action layer 37 plans relatively long term actions on the basis of the contents of the short term memory section 35 and those of the long term memory section 36.

A deliberate action is an action made in a given situation or according to an order given by a man on the basis of an assumption or a plan for realizing the action. For example, an action of searching for a route from the current position of the robot and a target position of the robot is a deliberate action. Such an assumption or a plan can require processing time and computational load (processing time in other words) that is longer than the response time that the robot 1 requires to maintain an interaction, a deliberate action is made on the basis of an assumption or a plan while the robot is making reflective actions and situation-dependent actions repeatedly.

The deliberate action layer 37, the situation-dependent action layer 38 and the reflective action section 39 can be described as higher order application programs that are not dependent on the hardware configuration of the robot 1. On the other hand, hardware-dependent action control section 40 operates to output voices by way of the speaker 12 of the input/output section 3 and/or flash the LEDs 14 according to a predetermined pattern by driving the corresponding ones of the drive units $15_1$~$15_n$ of the drive section 4 according to the order given from any of the higher order application programs.

(1-3) Configuration of the Internal Condition Management Section 34

Now, the configuration of the internal condition management section 34 of the action control system 30 that directly relates to the dialog control function of the robot will be described. The dialog control function of the robot will be described in greater detail hereinafter.

As described above, the internal condition management section 34 manages the formula models of emotions including instincts and sentiments so as to manage the internal condition of the robot 1 in terms of instincts and sentiments in response to each external stimulus recognized by the visual recognition function section 31, the aural recognition function section 32 and/or the tactile recognition function section 33.

For the purpose of the invention, there are provided nine instinctive elements including fatigue, body temperature, pain, hunger, thirst, affection, curiosity, elimination and sexual desire and correspondingly eighteen emotional elements including happiness, sadness, anger, surprise, disgust, fear, frustration, boredom, somnolence, gregariousness, patience, tension, relaxation, alertness, guilt, spite, loyalty, submission and jealousy.

The internal condition management section 34 has parameters for expressing the intensity of each of the instinctive elements and the emotional elements. The instincts and the sentiments of the robot 1 are incessantly changed as the parameters are periodically updated on the basis of the outcome of recognition of the visual recognition function section 31, the aural recognition function section 32 and/or the tactile recognition function section 33, the elapsed time and so on.

More specifically, if the variation of each instinctive element as computationally determined by means of a predetermined operational formula on the basis of the outcome of recognition of the visual recognition function section 31, the aural recognition function section 32 and/or the tactile recognition function section 33, the elapsed time since the last update and so on is ΔI [k], the current parameter value of the instinctive element is I [k] and the coefficient for expressing the sensitivity of the instinctive element is ki, the internal condition management section 34 computes with a predetermined cycle period the parameter value I [k+1] of the next cycle period, using the formula of $$I[k+1]=I[k]+k1 \times \Delta I[k] \quad (1)$$

and updates the parameter value of the instinctive element by replacing the current parameter value of the instinctive element with the outcome of the computation.

Additionally, if the variation of each emotional element as computationally determined by means of a predetermined operational formula on the basis of the outcome of recognition of the visual recognition function section 31, the aural recognition function section 32 and/or the tactile recognition function section 33, the elapsed time since the last update and so on is ΔE [t], the current parameter value of the emotional element is E [t] and the coefficient for expressing the sensitivity of the emotional element is ke, the internal condition management section 34 computes with the predetermined cycle period the parameter value E [t+1] of the next cycle period, using the formula of $$E[t+1]=E[t]+ke \times \Delta E[t] \quad (2)$$

and updates the parameter value of the emotional element by replacing the current parameter value of the emotional element with the outcome of the computation.

Note that the extent to which the outcome of recognition of the visual recognition function section 31, the aural recognition function section 32 and/or the tactile recognition function section 33 and so on affects each of the instinctive elements and the emotional elements is predefined. For example, the outcome of recognition of "being stroked" by the tactile recognition function section 33 most greatly affects the variation ΔI [k] of the parameter value of "affection" out of the instinctive elements and the variation ΔE [t] of the parameter value of "happiness" out of the emotional elements.

(2) Dialog Control Function of Robot 1

(2-1) Dialog Control Function of Robot 1

Now, the dialog control function with which the robot 1 is provided will be described below.

The robot 1 is provided with a dialog control function of acquiring information on each of a certain number of predetermined items (to be referred to as the value of the item hereinafter) including the name, the birthday, the favorites and so on of the user or some other object (to be referred to as the user or the like hereinafter) and stores it with a predetermined format as shown in FIG. 4 so as to be able to dialog with the user, utilizing the stored value of each item.

In FIG. 4, the columns show the values assigned to the respective items ("name", "kind", "face ID", "speaker ID", "birthday", "favorite" and "friend") and the rows show the values acquired for the respective items of each object ("Yukiko", "human", "0", "1", "73/5/2", "tea" and "Kazumi"). The first numeral of each row denotes the ID of the object (object ID) assigned to the object when the object is registered for the first time.

While all the items of each of the object have already acquired respective values in FIG. 4, the values of "name", "speaker ID", "birthday", "favorite" and "friend" are acquired by way of various voice recognition processing operations of the aural recognition function section 32 in dialogs with the user and stored, while the values of "face ID" and "kind" are acquired by way of various image recognition processing operations of the visual recognition function section 31 in dialogs with the user and stored.

In FIG. 4, the numeral arranged to the left of each value indicates the degree of impression relative to the value. The degree of impression provides a measure for determining if the robot 1 may use the item, or the topic, in conversations in the future or not. In the case of FIG. 4, a higher degree of impression may be rated as good (would like to use it in the next conversation), whereas a lower degree of impression may be rated as bad (would not like to use it in conversations). In this embodiment, the degree of impression, each degree of impression is obtained by determining the difference between the parameter value of "affection" immediately before acquiring the value of the related item and the parameter value of "affection" immediately after acquiring the value of the related item in the internal condition management section 34.

Figure 5:
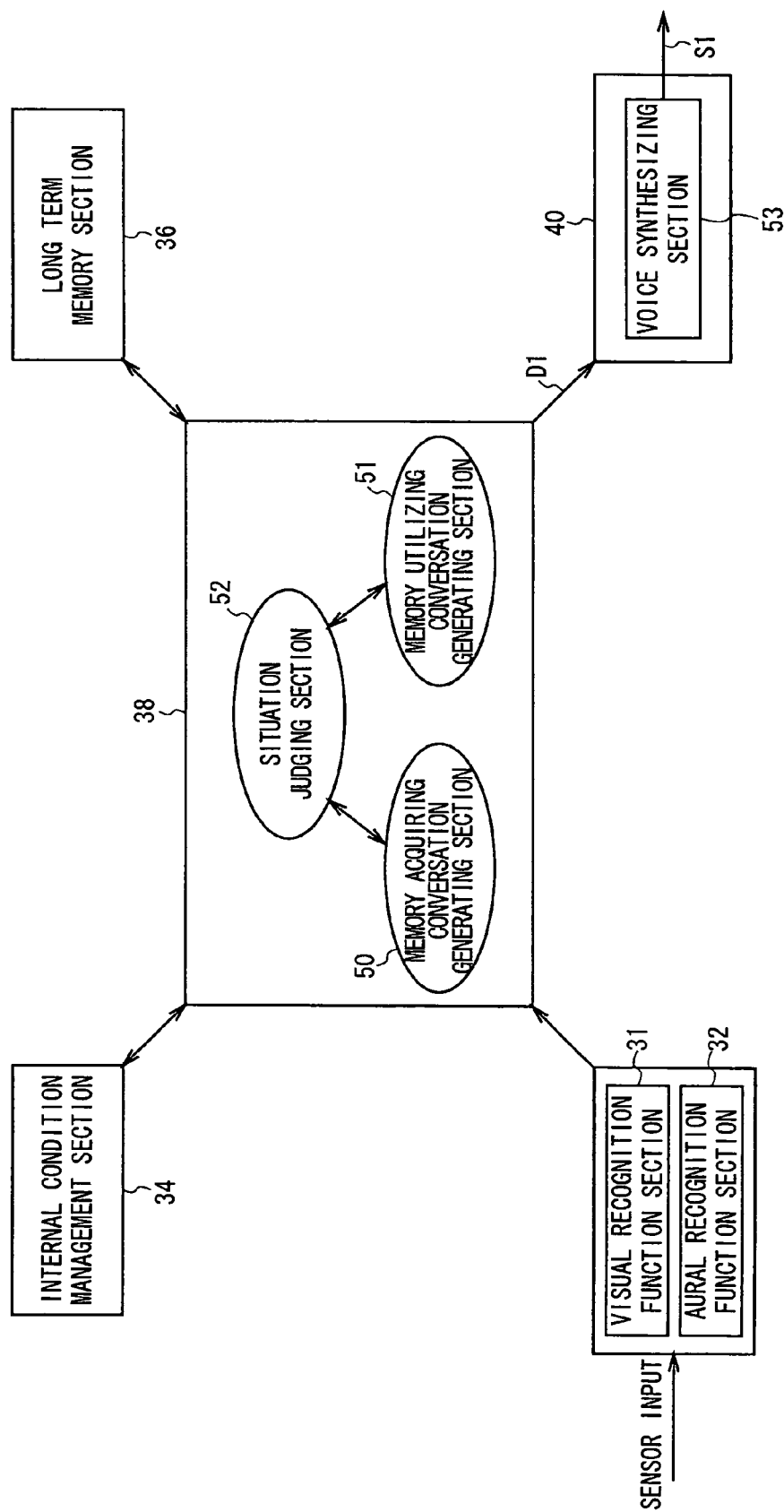
FIG. 5 is a conceptual illustration of a principal part of the dialog control function of the action control system.

The dialog control function is mainly realized by way of processing operations of the situation-dependent action layer 38 of the action control system 30 as described above by referring to FIG. 3. As shown in FIG. 5, from the viewpoint of processing operations relating to the dialog control function, the situation-dependent action layer 38 can be functionally divided into a memory acquiring conversation generating section 50 that generates conversations for acquiring values of the items including those of the user (to be referred to as acquiring conversations hereinafter), a memory utilizing conversation generating section 51 that generates conversations for utilizing the acquired values of the items including those of the user (to be referred to as utilizing conversations hereinafter) and a situation judging section 52 that controls the memory acquiring conversation generating section 50 and the memory utilizing conversation generating section 51.

As the situation judging section 52 recognizes the presence of the user with whom the robot 1 can dialog on the basis of the outcome of recognition of the visual recognition function section 31 and the outcome of recognition of the aural recognition function section 32 that can be obtained by way of the short term memory section 35 (FIG. 3), it sends the face ID and the speaker ID of the user acquired as the outcome of recognition of the visual recognition function section 31 and that of the aural recognition function section 32 to the memory acquiring conversation generating section 50 and the memory utilizing conversation generating section 51 and, at the same time, enquires the memory acquiring conversation generating section 50 and the memory utilizing conversation generating section 51 if they can respectively generate an acquiring conversation or a utilizing conversation or not (Step SP1A, Step SP1B).

The memory acquiring conversation generating section 50 and the memory utilizing conversation generating section 51 perform conversation generating processing operations of generating a topic and determining the method of utilizing the topic in order to respectively generate an acquiring conversation and a utilizing conversation according to the predetermined rules for generating a topic and those for determining the method of utilizing the topic (Step SP2A, Step SP2B).

A total of six rules are provided in this embodiment as rules for generating a topic.

The first topic generation rule is a rule of selecting an item of the same object that is different from the topic used in the immediately preceding conversation as the next topic. In this embodiment, the item having the highest degree of impression is selected first. For example, referring to FIG. 4, if the topic of the immediately preceding conversation is the "birthday" of the "object ID1", the item having the highest degree of impression is selected as the topic of the next conversation out of all the times of the same "object ID1".

The second topic generation rule is a rule of selecting an item relating to the same object used in the immediately preceding conversation as the next topic. For example, referring to FIG. 4, if the topic of the immediately preceding conversation is the "favorite" of the "object ID1", the "dislike" of the "object ID1" is selected as the topic of the next conversation.

The third topic generation rule is a rule of selecting one of the items of the object that can be identified from the value of the item, or the topic, that is used in the immediately preceding conversation. In this embodiment, the item having the highest degree of impression is selected first. For example, referring to FIG. 4, if the topic of the immediately preceding conversation is the "friend" of the "object ID1", one of the items of the "fiend", who is the "object ID2", is selected as the topic of the next conversation.

The fourth topic generation rule is a rule of selecting the item of the same object that is same as the topic of the immediately preceding conversation for the next topic. For example, referring to FIG. 4, if the topic of the immediately preceding conversation is the "birthday" of the "object ID1", the same "birthday" of the same "object ID1" is selected as the topic of the next conversation.

The fifth topic generation rule is a rule of selecting a topic having a value of some other object same as that of the item, or the topic, of the immediately preceding conversation is selected as the next topic. For example, referring to FIG. 4, if the topic of the immediately preceding conversation is the "favorite" of the "object ID1", the "favorite" of the "object ID3", which is "tea" and having a value same as that of the "favorite" of the "object ID1", is selected as the next topic.

The sixth topic generation rule is a rule of selecting an item of some other object having a value relating to that of the item, or the topic, used in the immediately preceding conversation as the next topic. For example, referring to FIG. 4, if the topic of the immediately preceding conversation is the "favorite" of the "object ID1", the favorite of the "object ID6", which is the "horse race", is selected from the "favorite" of "horse". Thus, the "favorite" of the "object ID6" is selected as the topic of the next conversation.

Note that, out of the first through sixth topic generation rules, the first through third topic generation rules can be utilized for both generating acquiring conversations and generating utilizing conversations, whereas the third through sixth rules can be used for generating utilizing conversations, although they cannot be used for generating acquiring conversations.

Thus, the memory acquiring conversation generating section 50 randomly selects one of the first through third topic generation rules, while the memory utilizing conversation generating section 51 randomly selects one of the first through sixth topic generation rules. Then, if the topic of the immediately preceding conversation is "the favorite of the object ID1", "the friend of the object ID1", "the dislike of the object ID1", "the birthday of the object ID2", "the birthday of the object ID1", "the favorite of the object ID3" or the "favorite of the object ID6" will be selected as the next topic according to the selected topic generation rules.

On the other hand, a total of three rules are provided in this embodiment for determining the method of utilizing the topic.

The first topic utilizing method determining rule is a rule of generating a speech by utilizing the value of the corresponding item stored in the long term memory section 36. If, for example, "the favorite of the object ID1" is generated as topic, a speech saying "Tea is Yukiko's favorite, isn't it?" or "What is Yukiko's favorite?" will be generated.

The second topic utilizing method determining rule is a rule of retrieving a data base on the basis of the value of a corresponding item stored in the long term memory section 36 and reading a related item so as to generate a speech by utilizing the read out item. If, for example, "the birthday of the object ID1" is generated as topic, the data base is retrieved by using the value "73/5/2" of the "birthday" as keyword and a speech saying "May 2nd is the day of traffic advertisement isn't it" is generated by utilizing the retrieved item of "the day of traffic advertisement".

The third topic utilizing method determining rule is a rule of retrieving a data base, using a related value that can be obtained from the value of a corresponding item stored in the long term memory 36 by computations or by association, and reading a further related item to generate a speech by utilizing the read out item. If, for example, "the birthday of the object ID1" is generated as topic, the data base is retrieved by using a horoscope data base, using "Taurus" obtained by computations from "73/5/2", which is the "birthday", as keyword, and a speech saying "People of Taurus are patient aren't they?" is generated by utilizing the obtained item of "patient".

Of the first through third topic utilizing method determining rules, the first topic utilizing method determining rule can be used for both generating acquiring conversations and generating utilizing conversations, whereas the second and third topic utilizing method determining rules can be used for generating utilizing conversations, although they cannot be used for generating acquiring conversations.

Thus, the memory acquiring conversation generating section 50 selects the first topic utilizing method determining rule, while the memory utilizing conversation generating section 51 randomly selects one of the first through third topic utilizing method determining rules. Then, they generate a speech for acquiring information or a speech utilizing the acquired information according to the selected topic utilizing method determining rules.

When the memory acquiring conversation generating section 50 and the memory utilizing conversation generating section 51 succeed in generating a topic and determining a method of utilizing the topic as a result of topic generation processing, they notify the situation judging section 52 of the success as well as the topic and the method of utilizing the topic. When, on the other hand, they do not succeeded in generating a topic and determining a method of utilizing the topic, they notify the situation judging section 52 of the failure (Step SP3A, Step SP3B).

On the other hand, if the situation judging section 52 receives a notification of the success in generating a topic and determining a method of utilizing the topic from both the memory acquiring conversation generating section 50 and the memory utilizing conversation generating section 51, it selects either the memory acquiring conversation generating section 50 and the memory utilizing conversation generating section 51 on the basis of the first extent as determined by the number of items for which values are not acquired yet out of all the items of the partner of dialog and the second extent as determined by the number of items for which values are already acquired out of all the items of the partner of dialog (Step SP4).

More specifically, the situation judging section 52 selects the memory acquiring conversation generating section 50 when the first extent is greater than the second extent, whereas the section 52 selects the memory utilizing conversation generating section 51 when the first extent is smaller than the second extent.

Then, as the situation judging section 52 selects either the memory acquiring conversation generating section 50 or the memory utilizing conversation generating section 51, it issues a command for starting a processing operation of acquiring a conversation or utilizing a conversation (to be referred to as conversation generating processing operation) on the basis of the topic and the method of utilizing the topic to the memory acquiring conversation generating section 50 or the memory utilizing conversation generating section 51, whichever appropriate (Step SP5).

If, on the other hand, the situation judging section 52 receives a notification of the success in generating a topic and determining a method of utilizing the topic from either the memory acquiring conversation generating section 50 or the memory utilizing conversation generating section 51, it issues a command for starting a conversation generating processing operation on the basis of the topic and the method of utilizing the topic to the memory acquiring conversation generating section 50 or the memory utilizing conversation generating section 51, whichever appropriate (Step SP5).

Then, the memory acquiring conversation generating section 50 or the memory utilizing conversation generating section 51, to whom the command is issued, starts a conversation generating processing operation. Firstly, it accesses the internal condition management section 34 and acquires the parameter value of "affection" out of the instinctive elements. Then, it sequentially sends out character string data D1 of the contents of each of a series of speeches for an acquiring conversation or a utilizing conversation that include the speeches for acquiring information (to be referred to as acquiring speeches hereinafter) or speeches for utilizing the acquired information (to be referred to as utilizing speeches hereinafter) that are generated on the basis of the topic and the method of utilizing it as determined in the above described manner to voice synthesizing section 53 of the hardware-dependent action control section 40.

Thus, as a result, a voice signal S1 is generated by the voice synthesizing section 53 on the basis of the character string data D1 and given to the speaker 12 (FIG. 1) so that, for example, the sound of an acquiring conversation of a series of speeches including an acquiring speech saying "What is Yukiko's favorite" or the sound of a utilizing conversation of a series of speeches including a utilizing speech saying "Tea is Yukiko's favorite, isn't it?" is output from the speaker 12 (Step SP6).

At this time, the response of the user to the topic is collected by the microphones 11 and applied to the aural recognition function section 32 of the action control system 30 (FIG. 3) and the sounded voice is recognized by the aural recognition function section 32.

If the memory acquiring conversation generating section 50 is selected in Step SP4, the memory acquiring conversation generating section 50 extracts an answer to the question (in other words, the value of the item to be acquired at the time) from the response of the user to the acquiring speech on the basis of the acquiring speech as a result of the voice recognition of the aural recognition function section 32 and stores it in the long term memory section 36 typically in the format as described above by referring to FIG. 4 (Step SP6).

Further, the memory acquiring conversation generating section 50 accesses the internal condition management section 34 to acquire the parameter value of "affection" at this time and compute the difference between the acquired parameter value and the parameter value of "affection" acquired immediately before the conversation. Then, the memory acquiring conversation generating section 50 stores the outcome in the long term memory 36 as the values of items of the user and so on acquired in the above manner as the degree of impression for that value (Step SP6).

Meanwhile, as the acquiring conversation or the utilizing conversation ends, the memory acquiring conversation generating section 50 or the memory utilizing conversation generating section 51, whichever appropriate, sends out a notification of the end of the conversation to the situation judging section 52 (Step SP7). Then, upon receiving the notification, the situation judging section 52 notifies the topic and the method of utilizing the topic as notified in Step SP3A or Step SP3B from the memory acquiring conversation generating section 50 or the memory utilizing conversation generating section 51 it selected in Step SP4 to the memory acquiring conversation generating section 50 and the memory utilizing conversation generating section 51 (Step SP8A, Step SP8B).

Thus, each of the memory acquiring conversation generating section 50 and the memory utilizing conversation generating section 51 stores the topic and the method of utilizing, of which they are notified, as conversation history (Step SP9A, Step SP9B) and go on sequentially and respectively generating acquiring conversations and utilizing conversations so as not to use the same topic in a single dialog with the same dialog partner in a manner as described above until the conversation ends (Step SP10A-Step SP1A~Step SP10A, Step S10B-Step SP1B~Step SP10B).

In this way, the robot 1 is adapted to carry on a conversation on topics specifically designed for the user, transitionally switching topics from one to another in a natural way, by sequentially acquiring and utilizing various pieces of information on the user.

(2-2) Specific Processing Operations of Each of the Conversation Generating Sections for Generating a Topic Now, specific processing operations of the memory acquiring conversation generating section 50 and those of the memory utilizing conversation generating section 51 for generating a topic will be described below.

Figure 7:
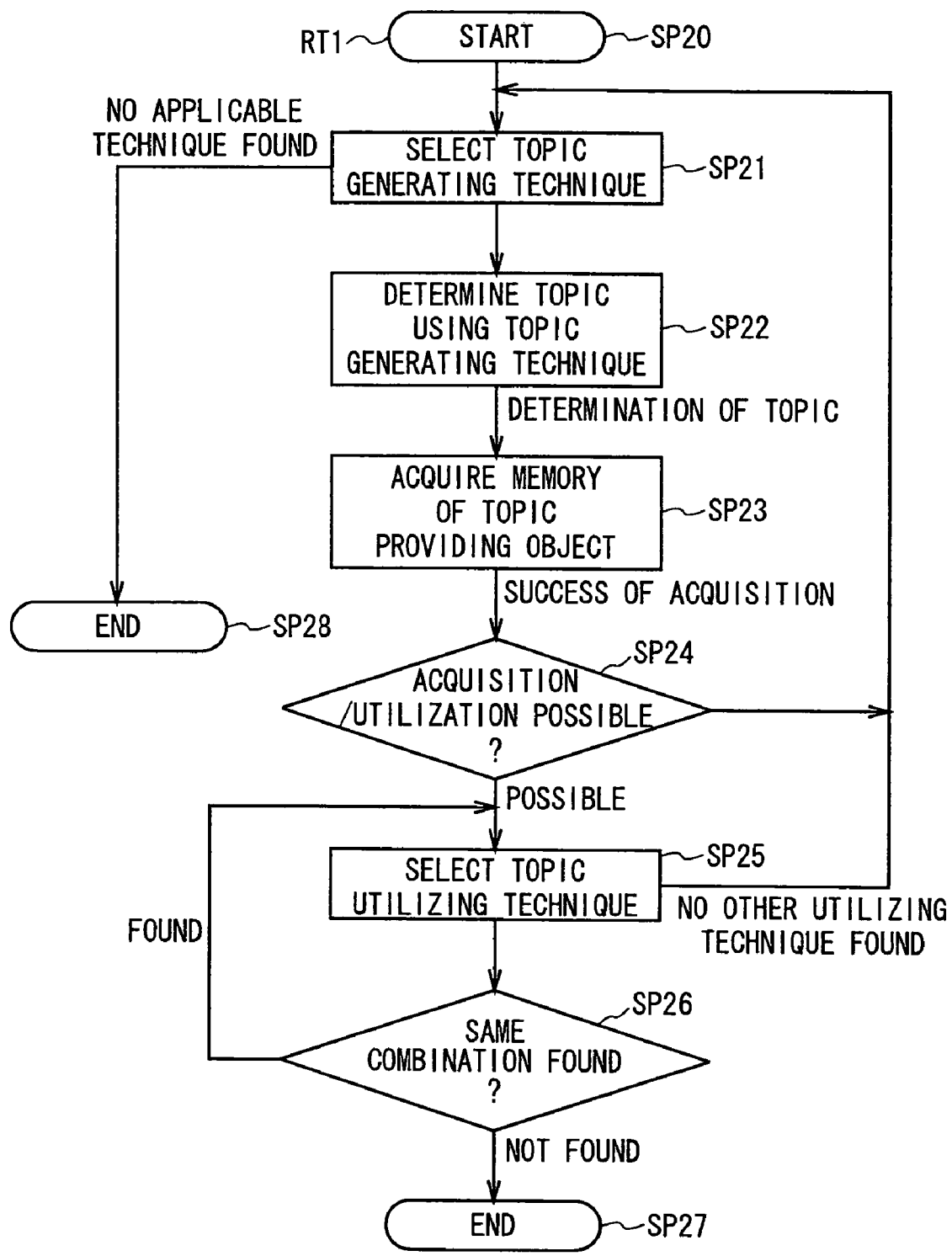
FIG. 7 is a flow chart of the dialog generation processing sequence.

Each of the memory acquiring conversation generating section 50 and the memory utilizing conversation generating section 51 generates a topic and a method of utilizing the topic, following the topic generating processing sequence RT1 shown in FIG. 7.

Figure 6:
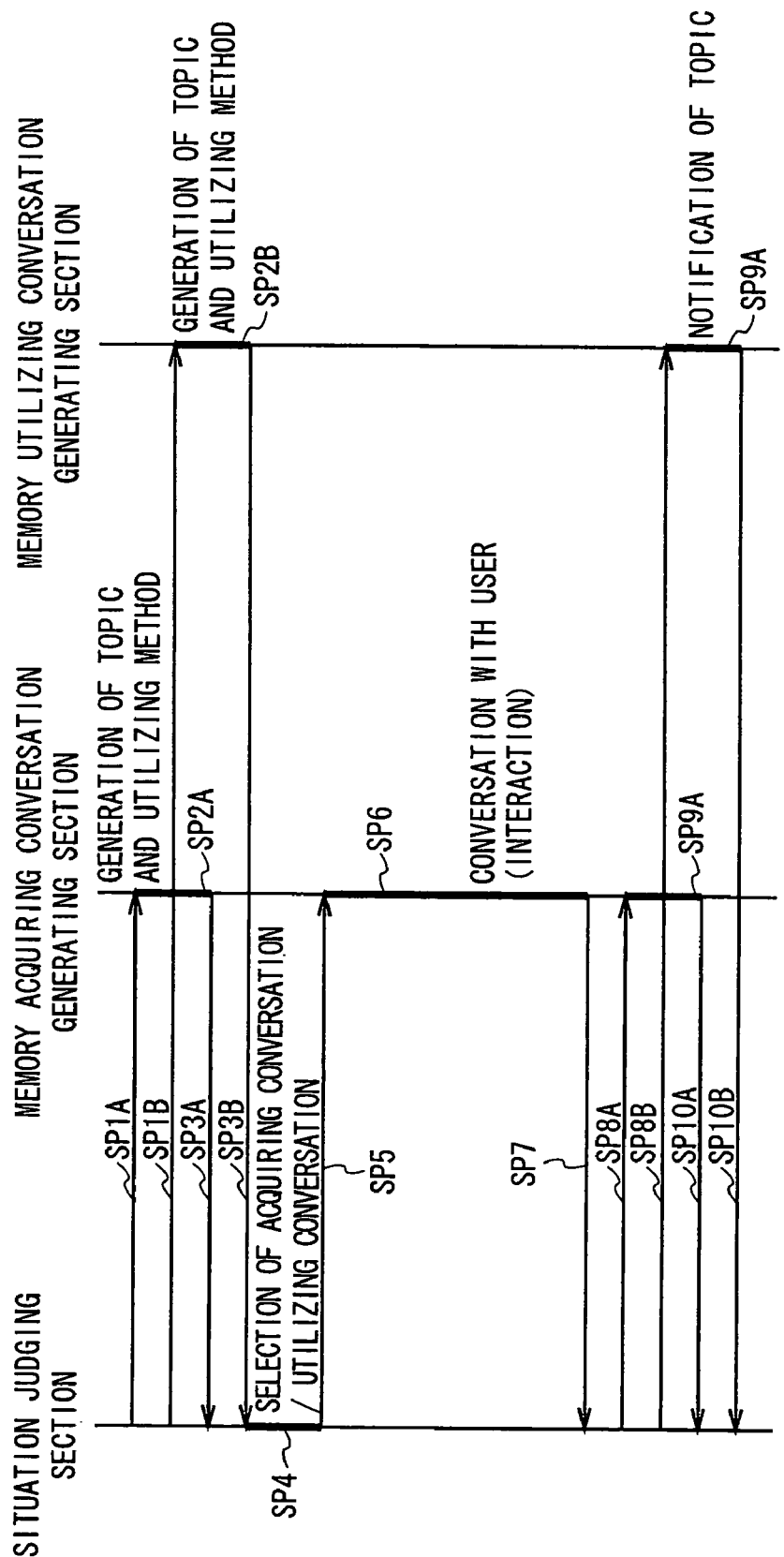
FIG. 6 is a conceptual illustration of the conversation generation sequence.

When an inquiry if an acquiring conversation and a utilizing conversation can be generated or not arrives from the situation judging section 52 in Step SP1A and in Step SP1B of FIG. 6, each of the memory acquiring conversation generating section 50 and the memory utilizing conversation generating section 51 starts the topic generating processing sequence RT1 in Step SP20 and then randomly selects one of the first through third topic generation rules or the first through sixth topic generation rules, whichever appropriate, in the subsequent step, or Step SP21.

Then, each of the memory acquiring conversation generating section 50 and the memory utilizing conversation generating section 51 proceeds to Step SP22, where it generates a topic according to the topic utilization rule selected in Step SP1. Thus, if the topic of the immediately preceding conversation is "the favorite of the object ID1", the generated topic will be "the friend of the object ID1", "the dislike of the object ID1" or the like.

Subsequently, each of the memory acquiring conversation generating section 50 and the memory utilizing conversation generating section 51 proceeds to Step SP23, where it reads out the data in the memory area that corresponds to the "name" of the object ID1 and the data in the memory area that corresponds to the corresponding item of the object ID1 in the long term memory section 36. If, for example, the topic selected in Step SP21 is "the friend of the object ID1", the data in the memory area of the long term memory section 36 that corresponds to the "name" column of the "object ID1" in FIG. 4 and the data in the memory area of the long term memory section 36 that corresponds to the "friend" column of the "object ID1" are read out.

Note, however, there may be cases where no value is acquired yet for the "name" of the object ID1 and for the corresponding item of the object ID1, and no data is stored in the read out memory area.

Thus, each of the memory acquiring conversation generating section 50 and the memory utilizing conversation generating section 51 judges in the next step, or Step SP24, if it can generate an acquiring conversation or a utilizing conversation, whichever appropriate, or not, or a value is acquired for each of the desired items or not on the basis of the data read out in Step SP23.

If the outcome of Step SP24 is negative, the memory acquiring conversation generating section 50 or the memory utilizing conversation generating section 51, whichever appropriate, returns to Step SP21 and repeats the steps of Step SP21 through Step SP24 until a positive answer is obtained in Step SP24.

If, on the other hand, the outcome of Step SP24 is positive, the memory acquiring conversation generating section 50 or the memory utilizing conversation generating section 51, whichever appropriate, proceeds to Step SP25. If the conversation generating section is the memory acquiring conversation generating section 50, it selects the first topic utilizing method determining rule as topic utilizing method determining rule in Step SP25. If, on the other hand, the conversation generating section is the memory utilizing conversation generating section 51, it randomly selects one of the first through third topic utilizing method determining rules as topic utilizing method determining rule in Step SP25.

Then, each of the memory acquiring conversation generating section 50 and the memory utilizing conversation generating section 51 proceeds to Step SP26, where it judges if the combination of the topic and the method of utilizing it as selected respectively in Step SP21 and Step SP25 is already used in a conversation between the robot 1 and the user or not by checking the stored conversation history.

If the memory acquiring conversation generating section 50 or the memory utilizing conversation generating section 51, whichever appropriate, obtains a negative outcome in Step SP26, it proceeds to Step SP27, where it terminates the topic generating processing sequence RT1 and subsequently notifies the situation judging section 52 of the success in generating a topic and determining a method of utilizing the topic (Step SP3A, Step SP3B of FIG. 6).

If, on the other hand, the memory acquiring conversation generating section 50 or the memory utilizing conversation generating section 51, whichever appropriate, obtains a positive outcome in Step SP26, it returns to Step SP25 and selects a new top utilizing method determining rule and repeats the loop of Steps SP25-SP26-SP25 until all the combinations of the topic utilizing method determining rules are tested for the topic or a positive outcome is obtained in Step SP26.

If the memory acquiring conversation generating section 50 or the memory utilizing conversation generating section 51, whichever appropriate, tests all the combinations of the topic utilizing method determining rules for the topic but no negative outcome is obtained in Step SP27 as a result of the processing to confirm that there is no topic utilizing method determining rule that can be selected for the topic, it returns to Step SP21 to generate a new topic and repeats the above steps starting from Step SP2.

Additionally, if the memory acquiring conversation generating section 50 or the memory utilizing conversation generating section 51, whichever appropriate, confirms that it is not possible to generate a conversation by any one of the combinations of all the topics and all the utilizing methods (not able to get to Step SP27) by repeating the processing of Step SP21 through SP26, it proceeds to Step SP28, where it terminates the topic generating processing sequence RT1 and notifies the situation judging section 52 of the fact that it cannot generate any topic nor a topic utilizing method (Step SP3A, Step SP3B of FIG. 6).

In this way, the memory acquiring conversation generating section 50 and the memory utilizing conversation generating section 51 can generate a topic and determine a method of utilizing the topic.

(2-3) Specific Processing Operations of Each of the Conversation Generating Sections for Generating a Conversation Now, specific processing operations of the memory acquiring conversation generating section 50 and those of the memory utilizing conversation generating section 51 for generating a conversation will be described below.

Figure 8:
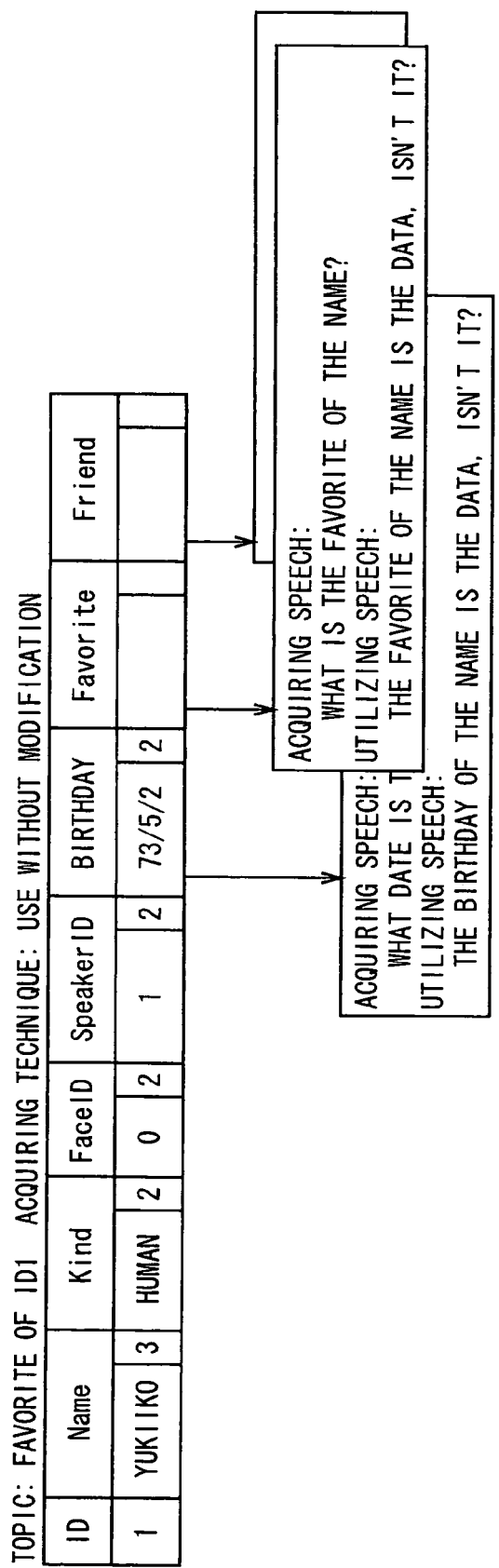
FIG. 8 is a conceptual illustration of a specific example of processing of the memory acquiring conversation generating section in a conversation generation processing operation.

Each of the memory acquiring conversation generating section 50 and the memory utilizing conversation generating section 51 has templates as shown in FIG. 8 to be used for generating an acquiring speech for acquiring the value of each of the items as illustrated in FIG. 4 and a utilizing speech for utilizing the value of the item.

The memory acquiring conversation generating section 50 and the memory utilizing conversation generating section 51 are so adapted that, when generating conversations, they respectively generate character string data D1 of an acquiring speech for acquiring the value of the corresponding item and character string data D1 of a utilizing speech for utilizing the value of the item by applying, for example, the value of the "name" and that of the "favorite" of the object that provides the current topic to the corresponding part of the corresponding template of the item.

Additionally, the memory acquiring conversation generating section 50 and the memory utilizing conversation generating section 51 have a state transition model that predefines what speech is to be made at what timing for each utilizing method, or for each of the above described first through third topic utilizing method determining rules in order to respectively generate an acquiring conversation of a series of speeches including an acquiring speech and a utilizing conversation of a series of speeches including a utilizing speech generated on the basis of the topic and the method of utilizing the topic as determined in Step SP2A and Step SP2B of FIG. 6.

Figure 9:
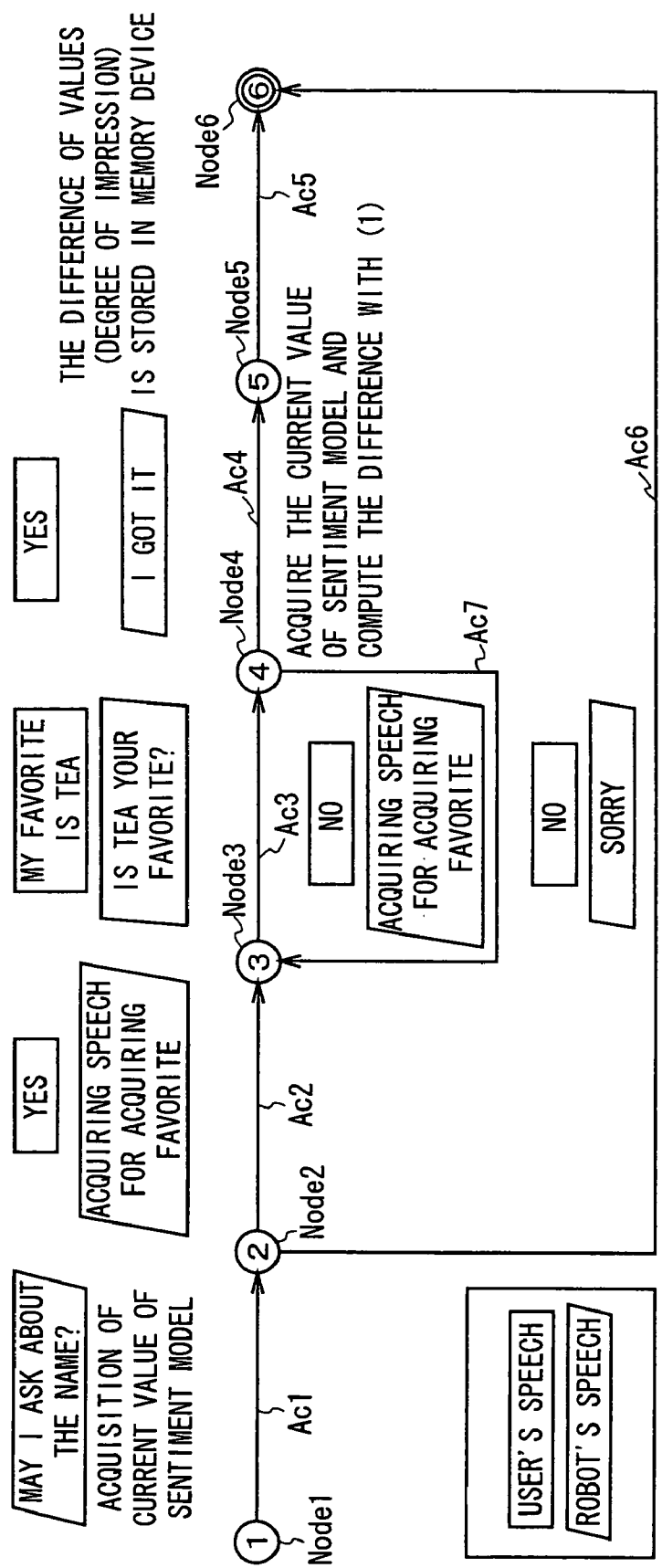
FIG. 9 is a conceptual illustration of a specific example of processing of the memory acquiring conversation generating section in a conversation generation processing operation.

In a state transition model, nodes (Node 1 through Node 6) that represent respective states are linked by paths, which are also referred to as arcs (Ac1 through Ac6), and a speech to be made and a processing operation to be performed are correlated to each of the paths as shown in FIG. 9.

When generating conversations including an acquiring conversation and a utilizing conversation, the memory acquiring conversation generating section 50 and the memory utilizing conversation generating section 51 make the states (Node 1 through Node 6) sequentially transit according to the respective corresponding state transition models and sequentially send out the character string data D1 correlated to the path (arcs Ar1 through Ar7) to be passed through to the voice synthesizing section 53 (FIG. 5) so as to sequentially output the predetermined voiced speeches in a predetermined order from the speaker 12.

At this time, the acquiring speech and the utilizing speech are correlated to a path of the respective state transition models so that the memory acquiring conversation generating section 50 and the memory utilizing conversation generating section 51 respectively generate the acquiring speech and the utilizing speech in a manner as described above when passing through the respective paths and send them out the character string data D1 to the voice synthesizing section 53 so as to output the acquiring speech and the utilizing speech from the speaker 12.

In this way, the memory acquiring conversation generating section 50 and the memory utilizing conversation generating section 51 are adapted to respectively generate an acquiring conversation and a utilizing conversation containing respective series of speeches including respectively an acquiring speech and a utilizing speech that match the topic and the method of utilizing the topic as determined in Step SP2A and Step SP2B in FIG. 6.

FIGS. 8 and 9 illustrate a specific example of conversation (acquiring conversation) that may be held between the robot and the user in order to acquire the value of an item under the control of the memory acquiring conversation generating section 50. In the illustrated example, assume that the topic is "the favorite of the object ID1" and the first topic utilizing method determining rule is selected as method of utilizing the topic.

Then, the memory acquiring conversation generating section 50 initially makes a transition of state from Node 1 to Node 2 and outputs character string data D1 of a speech of "May I ask about Yukiko?" that is correlated to arc Ac1 to the voice synthesizing section 53 in order to ask the user for permission to acquire a memory and also access the internal condition management section 34 (FIG. 5) in order to acquire the parameter value of "affection".

Then, if the memory acquiring conversation generating section 50 confirms at Node 2 that the user responds positively, saying "Yes", on the basis of the outcome of the voice recognition of the aural recognition function section 32 (FIG. 5), it makes a transition of state from Node 2 to Node 3 and outputs character string data D1 of the acquiring speech correlated to arc Ac2, the speech of "What is the favorite of Yukiko?" in this example, to the voice synthesizing section 53.

If, on the other hand, the memory acquiring conversation generating section 50 confirms at Node 2 that user responds negatively, saying "No", on the basis of the outcome of the voice recognition of the aural recognition function section 32, it makes a transition of state from Node 2 to Node 6 and outputs character string data D1 of the acquiring speech correlated to arc Ac6, the speech of "Sorry" in this example, to the voice synthesizing section 53.

Then, if the memory acquiring conversation generating section 50 confirms at Node 3 that the user responds, saying "My favorite is tea.", on the basis of the outcome of the voice recognition of the aural recognition function section 32, it makes a transition of state from Node 3 to Node 6 and outputs character string data D1 of the acquiring speech correlated to arc Ac3, the speech of "Tea, right?" in this example, to the voice synthesizing section 53.

Subsequently, if the memory acquiring conversation generating section 50 confirms at Node 4 that the user responds negatively, saying "No", on the basis of the outcome of the voice recognition of the aural recognition function section 32, it makes a transition of state from Node 4 to Node 3 and outputs character string data D1 of the speech correlated to arc Ac7, the speech of "What is the favorite of Yukiko?" in this example, to the voice synthesizing section 53.

If, on the other hand, the memory acquiring conversation generating section 50 confirms at Node 4 that the user responds positively, saying "Yes", on the basis of the outcome of the voice recognition of the aural recognition function section 32, it makes a transition of state from Node 4 to Node 5 and outputs character string data D1 of the speech correlated to arc Ac4, the speech of "I got it." in this example, to the voice synthesizing section 53. It also accesses the internal condition management section 34 (FIG. 5) to acquire the parameter value of "affection" and compute the difference between the acquired parameter value of "affection" and the parameter value of "affection acquired before outputting the acquiring speech.

Additionally, the memory acquiring conversation generating section 50 subsequently makes a transition of state from Node 5 to Node 6 and stores "tea" as the value of the item of "favorite" of the user as acquired in a manner as described above in the long term memory 36 (FIG. 5) and, at the same time, the difference of the parameter values of "affection" as computed in a manner as described above in the long term memory 36 as the degree of impression for that value.

As the memory acquiring conversation generating section 50 makes a transition of state to Node 6, it notifies the situation judging section 52 (FIG. 5) of the fact that a series of speeches is over and subsequently ends the processing operation for generating this series of acquiring speeches.

Note that only the first topic utilizing method determining rule can be used for an acquiring conversation. In other words, all acquiring conversations are to be held according to the above described single state transition model.

Figure 10:
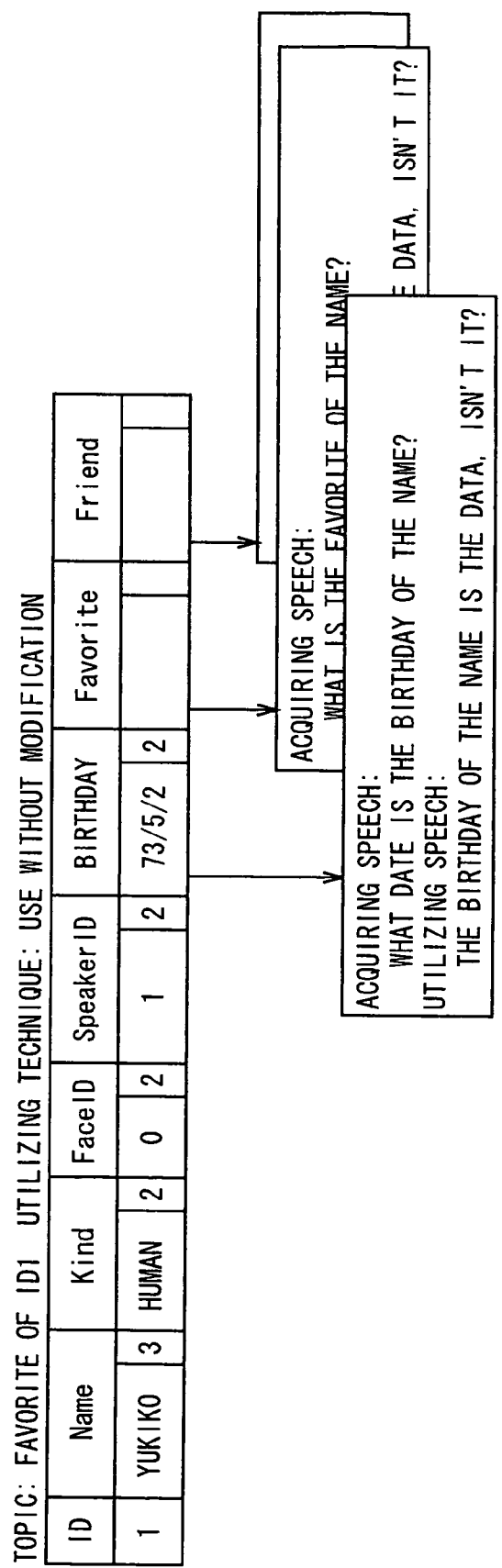
FIG. 10 is a conceptual illustration of the first specific example of processing of the memory utilizing conversation generating section in a conversation generation processing operation.
Figure 11:
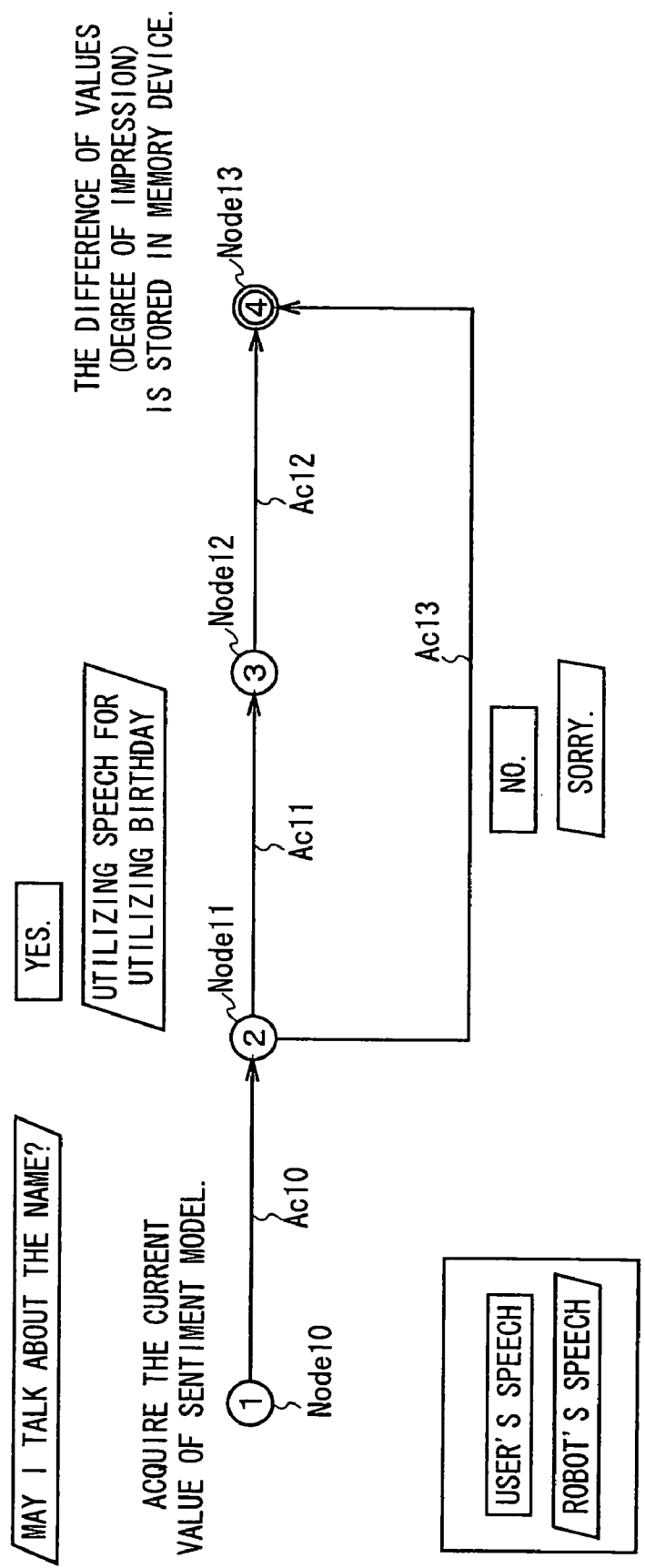
FIG. 11 is a conceptual illustration of the first specific example of processing of the memory utilizing conversation generating section in a conversation generation processing operation.

FIGS. 10 and 11 illustrate a first specific example of conversation (utilizing conversation) that may be held between the robot and the user in order to utilize the value of an item under the control of the memory utilizing conversation generating section 51. In the illustrated example, assume that the topic is "the birthday of the object ID1" and the first topic utilizing method determining rule is selected as method of utilizing the topic.

Then, the memory utilizing conversation generating section 51 initially makes a transition of state from Node 10 to Node 11 and outputs character string data D1 of a speech of "May I ask about Yukiko?" that is correlated to arc Ac10 to the voice synthesizing section 53 in order to ask the user for permission to talk about a topic relating to the user and also access the internal condition management section 34 (FIG. 5) in order to acquire the parameter value of "affection".

Then, if the memory utilizing conversation generating section 51 confirms at Node 11 that the user responds positively, saying "Yes", on the basis of the outcome of the voice recognition of the aural recognition function section 32 (FIG. 5), it makes a transition of state from Node 11 to Node 12 and outputs character string data D1 of the utilizing speech correlated to arc Ac11, the speech of "Yukiko's birthday is 73/5/2, isn't it?" in this example, to the voice synthesizing section 53. Thereafter, the memory utilizing conversation generating section 51 further makes transition of state from Node 12 to Node 13.

If, on the other hand, the memory utilizing conversation generating section 51 confirms at Node 11 that user responds negatively, saying "No", on the basis of the outcome of the voice recognition of the aural recognition function section 32, it makes a transition of state from Node 11 to Node 13 and outputs character string data D1 of the speech correlated to arc Ac13, the speech of "Sorry" in this example, to the voice synthesizing section 53.

As the memory utilizing conversation generating section 51 makes a transition of state to Node 13, it notifies the situation judging section 52 (FIG. 5) of the fact that a series of speeches is over and subsequently ends the processing operation for generating this series of utilizing speeches.

Figure 12:
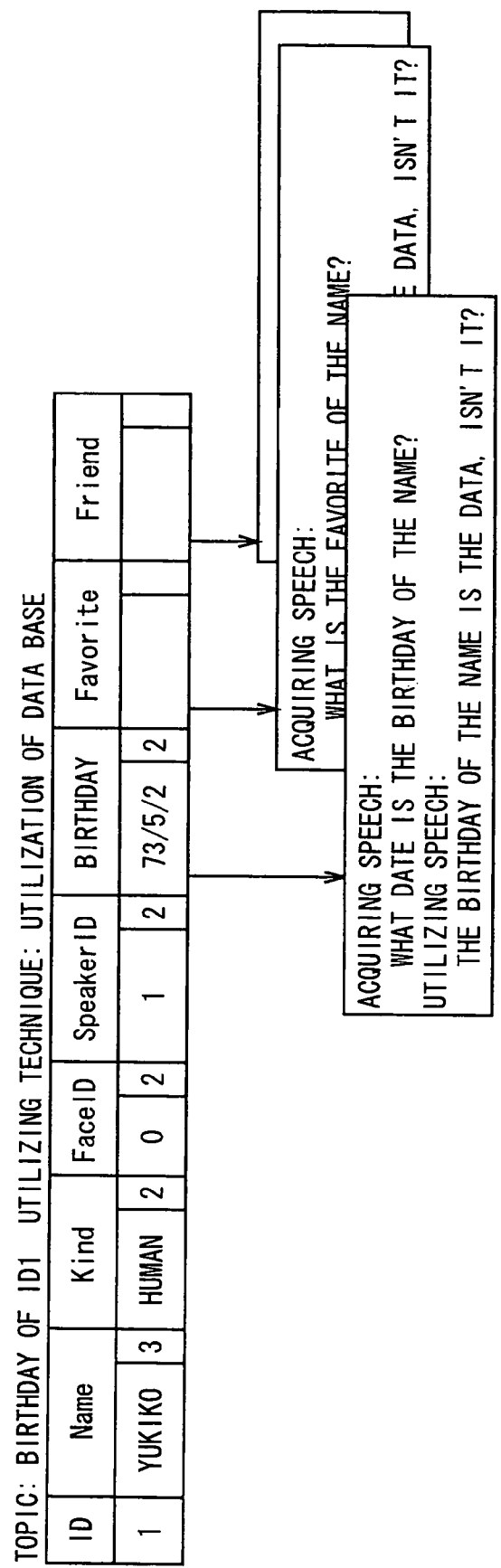
FIG. 12 is a conceptual illustration of the second specific example of processing of the memory utilizing conversation generating section in a conversation generation processing operation.
Figure 13:
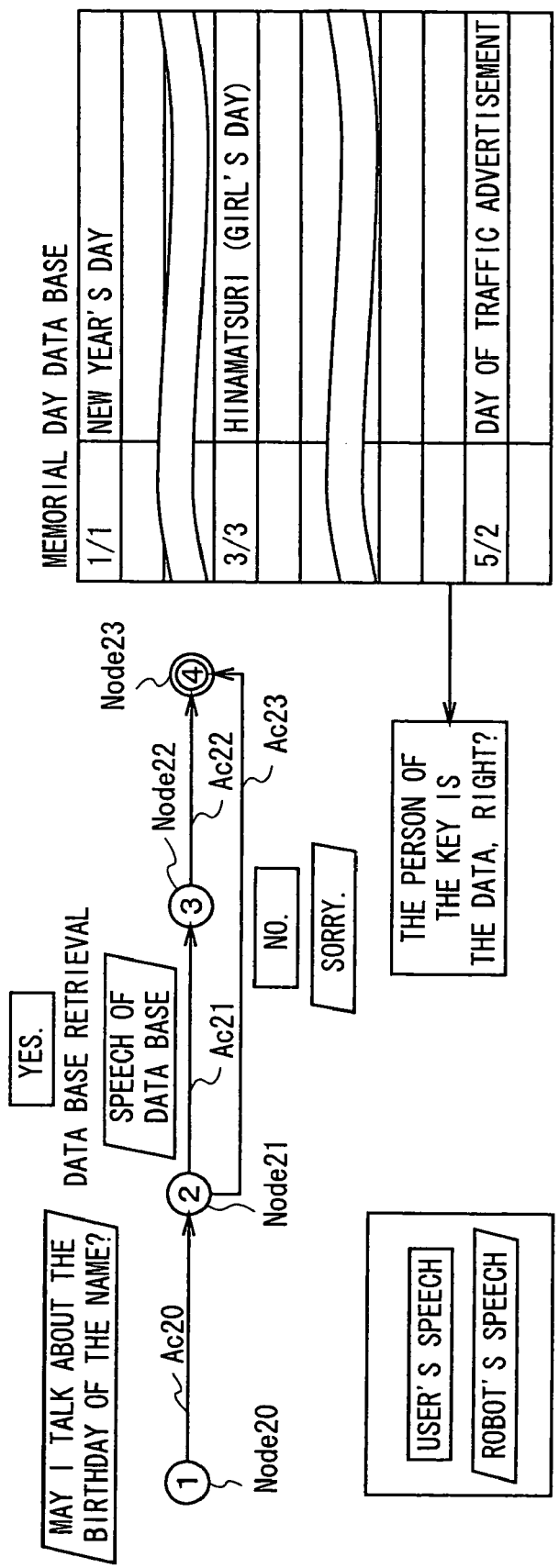
FIG. 13 is a conceptual illustration of the second specific example of processing of the memory utilizing conversation generating section in a conversation generation processing operation.

FIGS. 12 and 13 illustrate a second specific example of conversation (utilizing conversation) that may be held between the robot and the user in order to utilize the value of an item under the control of the memory utilizing conversation generating section 51. In the illustrated example, assume that the topic is "the birthday of the object ID1" and the second topic utilizing method determining method is selected as method of utilizing the topic.

Then, the memory utilizing conversation generating section 51 initially makes a transition of state from Node 20 to Node 21 and outputs character string data D1 of a speech of "May I ask about Yukiko?" that is correlated to arc Ac20 to the voice synthesizing section 53 in order to ask the user for permission to talk about a topic relating to the user and also access the internal condition management section 34 (FIG. 5) in order to acquire the parameter value of "affection".

Then, if the memory utilizing conversation generating section 51 confirms at Node 21 that the user responds positively, saying "Yes", on the basis of the outcome of the voice recognition of the aural recognition function section 32 (FIG. 5), it makes a transition of state from Node 21 to Node 22 and reads the value of the "birthday" of "the object ID1" and retrieves the memorial day data base, using the obtained value of "73/5/2". As the memory utilizing conversation generating section 51 acquires "the day of traffic advertisement", it outputs character string data D1 of the speech of, for example, "May 2nd is the day of traffic advertisement, you know.", to the voice synthesizing section 53. Thereafter, the memory utilizing conversation generating section 51 further makes transition of state from Node 22 to Node 23.

If, on the other hand, the memory utilizing conversation generating section 51 confirms at Node 21 that user responds negatively, saying "No", on the basis of the outcome of the voice recognition of the aural recognition function section 32, it makes a transition of state from Node 21 to Node 23 and outputs character string data D1 of the speech correlated to arc Ac23, the speech of "Sorry" in this example, to the voice synthesizing section 53.

As the memory utilizing conversation generating section 51 makes a transition of state to Node 23, it notifies the situation judging section 52 (FIG. 5) of the fact that a series of speeches is over and subsequently ends the processing operation for generating this series of utilizing speeches.

Figure 14:
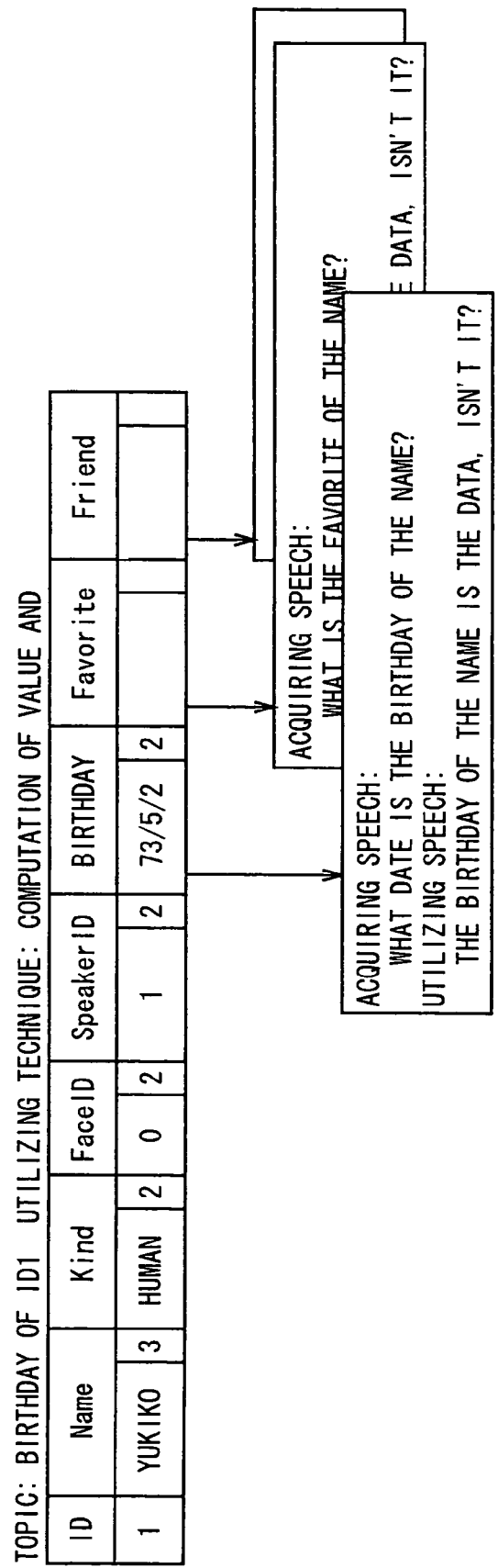
FIG. 14 is a conceptual illustration of the third specific example of processing of the memory utilizing conversation generating section in a conversation generation processing operation.
Figure 15:
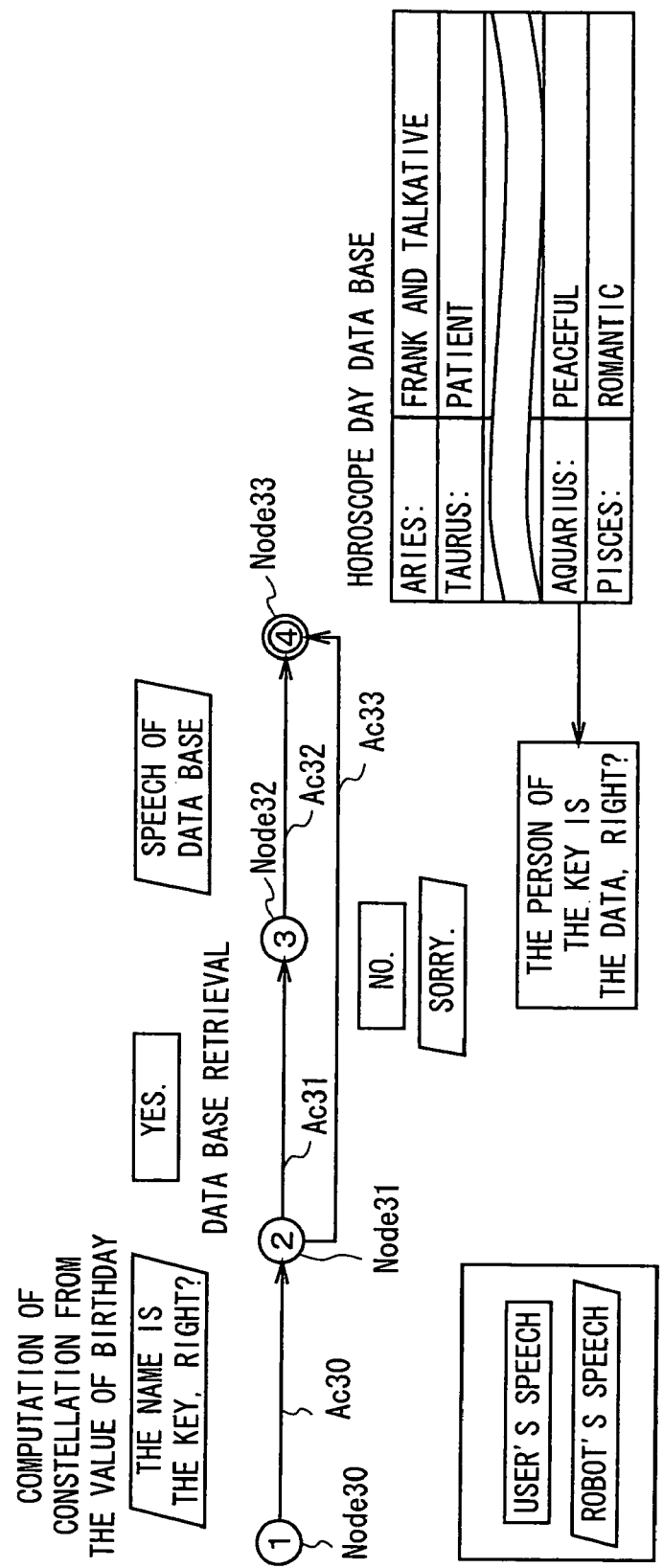
FIG. 15 is a conceptual illustration of the third specific example of processing of the memory utilizing conversation generating section in a conversation generation processing operation.

FIGS. 14 and 15 illustrate a third specific example of conversation (utilizing conversation) that may be held between the robot and the user in order to utilize the value of an item under the control of the memory utilizing conversation generating section 51. In the illustrated example, assume that the topic is "the birthday of the object ID1" and the third topic utilizing method determining rule is selected as method of utilizing the topic.

Then, the memory utilizing conversation generating section 51 initially makes a transition of state from Node 30 to Node 31, where it reads out the value of the "birthday" of "the object ID1" from the long term memory 36 (FIG. 5) and computationally determines the constellation, using it as keyword. Then, it generates character string data D1 of the speech of "Yukiko is a girl of Taurus, isn't she?" by using the obtained item of "Taurus" and outputs the speech to the voice synthesizing section 53 (FIG. 5).

Then, if the memory utilizing conversation generating section 51 confirms at Node 31 that the user responds positively, saying "Yes", on the basis of the outcome of the voice recognition of the aural recognition function section 32 (FIG. 5), it makes a transition of state from Node 31 to Node 32 and retrieves the constellation data base, using "Taurus" as keyword. As the memory utilizing conversation generating section 51 acquires the item of "the day of traffic advertisement", it outputs character string data D1 of a speech of, for example, "People of Taurus are patient aren't they?" to the voice synthesizing section 53. Thereafter, the memory utilizing conversation generating section 51 further makes transition of state from Node 32 to Node 33.

If, on the other hand, the memory utilizing conversation generating section 51 confirms at Node 31 that user responds negatively, saying "No", on the basis of the outcome of the voice recognition of the aural recognition function section 32, it makes a transition of state from Node 31 to Node 33 and outputs character string data D1 of the speed correlated to arc Ac23, the speech of "Sorry" in this example, to the voice synthesizing section 53.

As the memory utilizing conversation generating section 51 makes a transition of state to Node 33, it notifies the situation judging section 52 (FIG. 5) of the fact that a series of speeches is over and subsequently ends the processing operation for generating this series of utilizing speeches.

(3) Operation and Effects of this Embodiment

With the above described arrangement, the robot 1 acquires various pieces of information on the user by way of conversations (acquiring conversations) with the user and stores the acquired information in the long term memory 36 (FIG. 5) as values of items. Then, the robot 1 holds a (utilizing) conversation with the user, utilizing the values of items stored in the long term memory 36.

Therefore, the robot 1 can hold a conversation with the user on the user him- or herself and/or one or more than one topics relating to the user. In other words, the robot 1 can hold a conversation customized for the user and thus the user can feel the process of personalization so that the user will improve the affinity he or she feels for the robot 1.

The robot 1 generates a conversation according to the first through sixth topic generation rules. In other words, the robot 1 generates a conversation within a scope that can be associated with the immediately preceding conversation. Therefore, the topic will not abruptly jump in the course of dialog. Additionally, the robot 1 not only utilizes the information per se on the user it acquires but also retrieves data such as data on horoscope and memorial days according to the above described first through third topic utilizing method determining rules, while holding the conversation, so that the dialog with the robot 1 can become more and more interesting and the scope of variations of conversation can be enlarged.

Additionally, the robot 1 keeps conversation history in the memory acquiring conversation generating section 50 and the memory utilizing conversation generating section 51 so that the combination of a topic and a utilizing method is not generated repeatedly in a series of dialogs with the same user on the basis of the conversation history. Therefore, any speeches that relate to the information acquired by the robot 1 and are correlated to the user will not be output immediately after the acquisition of the information so that the conversation being held between the robot 1 and the user is prevented from becoming boring.

Additionally, the robot 1 is adapted to switch from an acquiring conversation to a utilizing conversation or vice versa under the control of the situation judging section 52 depending on the situation of acquiring information correlated to the user. Therefore, the robot 1 will neither utilize its memory in a situation where no information that is correlated to the user is available nor try to further acquire information in a situation where all information is acquired. In short, the robot 1 is prevented from acting unnaturally.

Additionally, the robot 1 stores the values of items of the user and so on in the long term memory section 36 along with degrees of impression and is adapted to select a topic on the basis of the stored degree of impression of the topic. Therefore, the frequency of appearance of the topic of an item can be varied as a function of the degree of impression. Thus, the robot 1 can highly entertainingly interact with the user as it talks about what it likes to talk and does not talk about what it does not like to talk.

With the above-described arrangement, the robot 1 acquires various pieces of information on the user through conversations with the user. Then, it stores the acquired pieces of information in the long term memory 36 (FIG. 5) as values for items and holds a conversation with the user, utilizing the values of items stored in the long term memory 36. Thus, it can hold a conversation customized for the user and thus the user can feel the process of personalization so that the user will improve the affinity he or she feels for the robot 1. Such a robot 1 is obviously highly entertaining.

(4) Other Embodiments

While the present invention is described above by way of the embodiment having a configuration as shown in FIGS. 1 through 3, the present invention is by no means limited thereto. In other words, the present invention can provide entertainment robots having a configuration other than the one described above and other robots as well as various apparatus other than robots and various dialog control devices that can control dialogs with a user. The present invention can also be applied to various pieces of software such as those for television games.

While the degree of impression of each item is determined when the robot acquires the value of the item and will not be updated since in the above description of the embodiment, the above embodiment may be so modified that the degree of impression can be updated after the acquisition thereof. With this arrangement, the frequency of appearance of each topic can be modified and the ongoing conversation can more reflect the current situation to make the robot 1 more entertaining.

While the degree of impression of each of various items is determined by computing the difference of the parameter values of "affection" held in the internal condition management section 34 before and after the acquisition of the item as described above by referring to FIG. 4 in the description of the embodiment, the present invention is by no means limited thereto and the degree of impression of an item may be determined by using the parameter values of some other instinctive element or emotional element that are held in the internal condition management section 34. Alternatively, some other technique may be used to determine the degree of impression of each item.

While the RAM 22 and the nonvolatile memory 24 (FIG. 2) that are internal memories of the control unit 2 are used as memory means for storing the values of items of an object in the above description of the embodiment, the present invention is by no means limited thereto and some other memory mediums may be used. Alternatively some other external storage mediums such as external memories may be used for the purpose of the invention.

Additionally, three modules are used as conversation generation means for selecting a topic associated with the topic used in the immediately preceding conversation and generating an acquiring conversation for acquiring the value of the item of the selected topic or a utilizing conversation for utilizing the value of the item of the topic already stored in the long term memory 36 as the next conversation and the three modules include a memory acquiring conversation generating section 50 that operates as memory acquiring conversation generation means for generating acquiring conversations, a memory utilizing conversation generating section 51 that operates as memory utilizing conversation generation means for generating utilizing conversations and a situation judging section 52 that operates as situation judgment means for selecting either the memory acquiring conversation generating section 50 or the memory utilizing conversation generating section 51 and having either the memory acquiring conversation generating section 50 or the memory utilizing conversation generating section 51, whichever appropriate, generate the next conversation in the above described embodiment. However, the present invention is by no means limited thereto and the conversation generation means may alternatively have some other configuration.

While a total of six topic generation rules including the first through sixth topic generation rules are provided to define a method of generating the topic of the next conversation in the above described embodiment, the present invention is by no means limited thereto and some other rules may alternatively be used as topic generation rules. The number of such rules is not limited to six.

Similarly, a total of three topic utilizing method determining rules including the first through third topic utilizing method determining rules are provided to define a method of utilizing the generated topic in the above described embodiment, the present invention is by no means limited thereto and some other rules may alternatively be used as topic utilizing method determining rules. The number of such rules is not limited to three.

As described above in detail, according to the invention there is provided a dialog control device comprising a memory means for storing various pieces of information appendant to an object as values corresponding to respective items of the object and a conversation generation means for selecting, in response to an item of the object defined as topic, another topic relating to the topic used in the immediately preceding conversation and generating an acquisition conversation for acquiring the value of the item selected as topic or a utilization conversation for utilizing the value of the item in the topic already stored in the memory means as the next conversation, the conversation generation means being adapted to store the acquired value acquired by the acquisition conversation as the value of the corresponding item. Then, with a dialog control device as defined above, the dialog control device with an enhanced level of entertainment can make a conversation that is customized for the user, or the object, with the user.

According to the invention, there is also provided a dialog control method comprising a first step of storing various pieces of information appendant to an object as values corresponding to respective items of the object and a second step of selecting, in response to an item of the object defined as topic, another topic relating to the topic used in the immediately preceding conversation and generating an acquisition conversation for acquiring the value of the item selected as topic or a utilization conversation for utilizing the value of the item in the already stored topic as the next conversation, the acquired value acquired by the acquisition conversation being stored in the second step as the value of the corresponding item. Then, with a dialog control method as defined above, the dialog control device can make a conversation that is customized for the user, or the object, with the user.

According to the invention, there is also provided a robot device comprising a memory means for storing various pieces of information appendant to an object as values corresponding to respective items of the object and a conversation generation means for selecting, in response to an item of the object defined as topic, another topic relating to the topic used in the immediately preceding conversation and generating an acquisition conversation for acquiring the value of the item selected as topic or a utilization conversation for utilizing the value of the item in the topic already stored in the memory means as the next conversation, the conversation generation means being adapted to store the acquired value acquired by the acquisition conversation as the value of the corresponding item. Then, with a robot device as defined above, the dialog control device with an enhanced level of entertainment can make a conversation that is customized for the user, or the object, with the user.

INDUSTRIAL APPLICABILITY

The present invention is applicable not only to entertainment robots and other robots of various different types but also to devices other than robots such as personal computers where dialog features are installed.

The invention claimed is:

1. A dialog control device to customize dialog between a user and a robot comprising:
   memory means for storing various pieces of information, appendant to an object, as values corresponding to respective items of the object and for storing a degree of impression relative to the value, wherein the degree of impression indicates whether the item is used in future conversations, wherein the various pieces of information are acquired by the robot and based on a voice recognition process and visual recognition of a user; and
   conversation generation means for (a) selecting, in response to an item of said object defined as a topic about the user, another topic about the user relating to the topic used in the immediately preceding conversation and (b) generating at least one of (1) an acquisition conversation for acquiring the value of the item, selected as the topic, from the user and (2) a utilization conversation for utilizing the value of the item in the topic, already stored in said memory means, as the next conversation based on the degree of impression wherein a frequency of a utilized item is varied;
   said conversation generation means being adapted to store the acquired value, acquired by said acquisition conversation, as the value of the corresponding item, wherein the dialog control device makes a conversation with the user that is customized for the user.

2. The device according to claim 1, wherein
   said conversation generation means selects any other item of the same object to which the topic used in said immediately preceding conversation belongs as the next topic and generates said utilization conversation by utilizing the value of the item already stored in said memory means.

3. The device according to claim 1, wherein
   said conversation generation means selects an item relating to the same object to which the topic used in said immediately preceding conversation belongs as the next topic and generates said utilization conversation by utilizing the value of the item already stored in said memory means.

4. The device according to claim 1, wherein
   said conversation generation means selects any of the items of said object identifiable from the value of the item of the topic used in said immediately preceding conversation as the next topic and generates said utilization conversation by utilizing the value of said any of the items already stored in said memory means.

5. The device according to claim 1, wherein
   said conversation generation means selects the item of said object same as the topic used in said immediately preceding conversation as the next topic and generates said utilization conversation by utilizing the value of the item already stored in said memory means.

6. The device according to claim 1, wherein
   said conversation generation means selects the same item of another object having a value same as the value of the item of the topic used in said immediately preceding conversation as the next topic and generates said utilization conversation by utilizing the value of the same item already stored in said memory means.

7. The device according to claim 1, wherein
   said conversation generation means selects an item of another object relating to the value of the item of the topic used in said immediately preceding conversation as the next topic and generates said utilization conversation by utilizing the related value already stored in said memory means.

8. The device according to claim 1, wherein
   said conversation generation means selects any other item of the same object to which the topic of said immediately preceding conversation belongs as the next topic and generates said acquisition conversation in order to acquire the value of said any other item.

9. The device according to claim 1, wherein
   said conversation generation means selects an item relating to the same object to which the topic used in said immediately preceding conversation belongs as the next topic and generates said acquisition conversation in order to acquire the value of the related item.

10. The device according to claim 1, wherein
    said conversation generation means selects any of the items of said object identifiable from the value of the item of the topic used in said immediately preceding conversation as the next topic and generates said acquisition conversation in order to acquire the value of said any of the items.

11. The device according to claim 1, wherein
    said conversation generation means generates said utilization conversation by utilizing a matter that can be acquired on the basis of the value of the item of said selected topic.

12. The device according to claim 1, wherein
    said conversation generation means includes:
    memory acquisition conversation generation means for generating said acquisition conversation;
    memory utilization conversation generation means for generating said utilization conversation;
    situation judgment means for selecting either said memory acquisition conversation generation means or said memory utilization conversation generation means and have said memory acquisition conversation generation means or said memory utilization conversation generation means, whichever selected, generate said next conversation.

13. The device according to claim 12, wherein
    said situation judgment means judges to have either said memory acquisition conversation generation means generate said acquisition conversation or said memory utilization conversation generation means generate said utilization conversation on the basis of the first extent that is the ratio of the number of items whose values are not acquired relative to the total number of items of the dialog partner and the second extent that is the ratio of the number of items whose values are acquired relative to the total number of items of said dialog partner.

14. The device according to claim 13, wherein said situation judgment means has said memory acquisition conversation generation means generate said acquisition conversation when said first extent is greater than said second extent but has said memory utilization conversation generation means generate said utilization conversation when said first extent is smaller than said second extent.

15. The device according to claim 1, wherein said conversation generation means holds history of the used topics and generates said acquisition conversation or said utilization conversation by referring to the history.

16. The device according to claim 15, wherein said conversation generation means generates said acquisition conversation or said utilization conversation so as not to use the same topic in a single dialog with the same dialog partner by referring to the history.

17. The device according to claim 1, characterized by further comprising:
    internal condition management means adapted to hold parameters indicating the internal condition and change the values of the parameters according to external stimuli;
    each of said degrees of impression representing the difference of the parameter values of the corresponding parameter held by said internal condition management means before and after the acquisition of the corresponding value.

18. A dialog control method to customize dialog between a user and a robot comprising:
    a first step of storing various pieces of information, appendant to an object, as values corresponding to respective items of said object and for storing a degree of impression relative to the value, wherein the degree of impression indicates whether the item is used in future conversations, wherein the various pieces of information are acquired by the robot and based on a voice recognition process and visual recognition of a user;
    a second step of selecting, in response to an item of said object defined as a topic about the user, another topic about the user relating to the topic used in the immediately preceding conversation; and
    a third step of generating at least one of (a) an acquisition conversation for acquiring the value of said item selected as the topic from the user and (b) a utilization conversation for utilizing the value of the item in the already stored topic as the next conversation based on the degree of impression wherein a frequency of a utilized item is varied;
    the acquired value, acquired by the acquisition conversation, being stored in the second step as the value of said corresponding item, wherein the robot makes a conversation with the user that is customized for the user.

19. The method according to claim 18, wherein any other item of the same object to which the topic used in said immediately preceding conversation belongs is selected as the next topic and said utilization conversation is generated by utilizing the value of the item already stored in said memory means in said second step.

20. The method according to claim 18, wherein an item relating to the same object to which the topic used in said immediately preceding conversation belongs is selected as the next topic and said utilization conversation is generated by utilizing the value of the item already stored in said memory means in said second step.

21. The method according to claim 18, wherein any of the items of said object identifiable from the value of the item of the topic used in said immediately preceding conversation is selected as the next topic and said utilization conversation is generated by utilizing the value of said any of the items already stored in said memory means in said second step.

22. The method according to claim 18, wherein the item of said object same as the topic used in said immediately preceding conversation is selected as the next topic and said utilization conversation is generated by utilizing the value of the item already stored in said memory means in said second step.

23. The method according to claim 18, wherein the same item of another object having a value same as the value of the item of the topic used in said immediately preceding conversation is selected as the next topic and said utilization conversation is generated by utilizing the value of the same item already stored in said memory means in said second step.

24. The method according to claim 18, wherein an item of another object relating to the value of the item of the topic used in said immediately preceding conversation is selected as the next topic and said utilization conversation is generated by utilizing the related value already stored in said memory means in said second step.

25. The method according to claim 18, wherein any other item of the same object to which the topic of said immediately preceding conversation belongs is selected as the next topic and said acquisition conversation is generated in order to acquire the value of said any other item in said second step.

26. The method according to claim 18, wherein an item relating to the same object to which the topic used in said immediately preceding conversation belongs is selected as the next topic and said acquisition conversation is generated in order to acquire the value of the related item in said second step.

27. The method according to claim 18, wherein any of the items of said object identifiable from the value of the item of the topic used in said immediately preceding conversation is selected as the next topic and said acquisition conversation is generated in order to acquire the value of said any of the items in said second step.

28. The method according to claim 18, wherein said utilization conversation is generated by utilizing a matter that can be acquired on the basis of the value of the item of said selected topic in said second step.

29. The method according to claim 18, wherein it is judged to generate either said acquisition conversation or said utilization conversation on the basis of the first extent that is the ratio of the number of items whose values are not acquired relative to the total number of items of the dialog partner and the second extent that is the ratio of the number of items whose values are acquired relative to the total number of items of said dialog partner in said second step.

30. The method according to claim 29, wherein
said acquisition conversation is generated when said first extent is greater than said second extent but said utilization conversation is generated when said first extent is smaller than said second extent in said second step.

31. The method according to claim 18, wherein
history of the used topics is held and said acquisition conversation or said utilization conversation is generated by referring to the history in said second step.

32. The method according to claim 31, wherein
said acquisition conversation or said utilization conversation is generated so as not to use the same topic in a single dialog with the same dialog partner by referring to the history in said second step.

33. The method according to claim 18, wherein
parameters indicating the internal condition are held and the values of the parameters are changed according to external stimuli in said first step;
each of said degrees of impression representing the difference of the parameter values of the corresponding parameter held by said internal condition management means before and after the acquisition of the corresponding value.

34. A robot device that customizes dialog with a user comprising:
memory means for storing various pieces of information appendant to an object as values corresponding to respective items of the object and for storing a degree of impression relative to the value, wherein the degree of impression indicates whether the item is used in future conversations, wherein the various pieces of information are acquired by the robot and based on a voice recognition process and visual recognition of the user; and conversation generation means for (a) selecting, in response to an item of said object defined as a topic about the user, another topic about the user relating to the topic used in the immediately preceding conversation and (b) generating at least one of (1) an acquisition conversation for acquiring the value of the item, selected as the topic, from the user and (2) a utilization conversation for utilizing the value of the item in the topic, already stored in said memory means, as the next conversation based on the degree of impression wherein a frequency of a utilized item is varied;

said conversation generation means being adapted to store the acquired value, acquired by the acquisition conversation, in said memory means as the value of the corresponding item, wherein the robot makes a conversation with the user that is customized for the user.

\* \* \* \* \*